US006138171A

United States Patent [19]
Walker

[11] Patent Number: 6,138,171

[45] Date of Patent: Oct. 24, 2000

[54] GENERIC SOFTWARE STATE MACHINE

[75] Inventor: Joseph E. Walker, Plano, Tex.

[73] Assignee: Alcatel USA Sourcing, L.P., Plano, Tex.

[21] Appl. No.: 08/968,997

[22] Filed: Nov. 12, 1997

Related U.S. Application Data

[60] Provisional application No. 60/030,824, Nov. 14, 1996.

[51] Int. Cl.$^{7}$ .......... G06F 9/00

[52] U.S. Cl. .......... 709/318

[58] Field of Search .......... 709/300, 303, 709/328, 315, 316, 317, 320, 318

[56] References Cited

U.S. PATENT DOCUMENTS

| | | | |
|---|---|---|---|
| 5,065,392 | 11/1991 | Sibbitt et al. | 370/58.2 |
| 5,065,393 | 11/1991 | Sibbitt et al. | 370/58.2 |
| 5,138,614 | 8/1992 | Baumgartner et al. | 370/62 |
| 5,295,139 | 3/1994 | Palmer | 370/60 |
| 5,384,771 | 1/1995 | Isidoro et al. | 370/58.2 |
| 5,390,171 | 2/1995 | Storm | 370/58.2 |
| 5,426,634 | 6/1995 | Cote et al. | 370/58.2 |
| 5,459,718 | 10/1995 | Kusano | 370/16 |
| 5,467,340 | 11/1995 | Umezu | 370/14 |
| 5,555,415 | 9/1996 | Allen | 709/300 |
| 5,727,214 | 3/1998 | Allen | 709/303 |

FOREIGN PATENT DOCUMENTS

| | | | |
|---|---|---|---|
| 0597646 | 5/1994 | European Pat. Off. | G06F 9/44 |

OTHER PUBLICATIONS

K. Koshimies, et al., "Automatic Synthesis of State Machines from Trace Diagrams", Software—Practice and Experience, vol. 24, No. 7, Jul. 1994, pp. 643–658.

D. Weiss, "Multiple Software State Machines on a Single–Chip Microcomputer", Wescon/87 Conference Record, vol. 31, No. 22/5, 1987, pp. 1–6.

I Coward, "The Finite State Machine Approach for Event Driven Software", First Australian Software Engineering Conference, May 14, 1986, pp. 19–26.

T. Ziomek, "Efficient, Maintainable Implementation of State Machines in Software", Motorola Technical Developments, vol. 23, Oct. 1994, pp. 70–72.

P. Pulli, "Embedded Microcontroller Operating System with State–Machine Support", Microprocessing and Microprogramming, vol. 18, No. 1–5, Dec 1986, pp. 59–62.

G. Bucci, et al., "Tools for Specifying Real–Time Systems", Real–Time Systems, vol. 8, No. 2/3, May 1995, 117–172.

(no author given) "Joint Object Services Submission," Life Cycle Services Specification, OMG TC Document 93.7.4, pp. 1–50, Jul. 1993.

(no author given) "Object Services RFP2 Submission," Externalization Service Specification, SunSoft, Inc., OMG TC Document 93.11.11, pp. 1–42, Nov. 1993.

(no author given) "The Common Object Request Broker: Architecture and Specifcation," OMG Document 93.xx.yy, Revision 1.2, Draft 29, pp. 1–87, Dec. 1993.

(no author given) "COM–CORBA Interworking RFP Fujitsu Part A Submission," Fijitsu Limited, pp. 1–14, Aug. 1995.

Shlaer et al., "Events and the FSM Mechanism," Report on Object Analysis Design, vol. 2, No. 5, pp. 9–12, Feb. 1996.

*Primary Examiner*—John W. Cabeca
*Assistant Examiner*—St. John Courtenay, III
*Attorney, Agent, or Firm*—Baker Botts L.L.P.

[57] ABSTRACT

A generic software state machine (10) for implementing a software application in an object oriented environment includes a set of entity objects (20, 30) defined for software elements of the software application, a set of state objects (26, 34, 38, 40) defined for each entity object representative of states that the software element may enter, and a set of event objects (36, 42) defined for each state object representative of inputs that the software element may receive or actions the software element may encounter while in the state represented by the state object.

33 Claims, 13 Drawing Sheets

FIG. 1
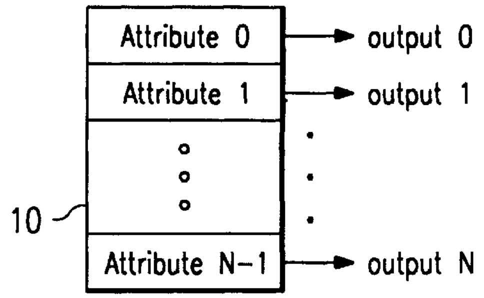
FIG. 2
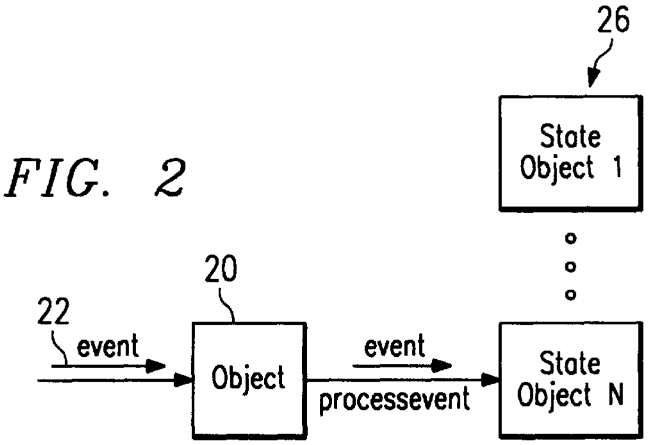
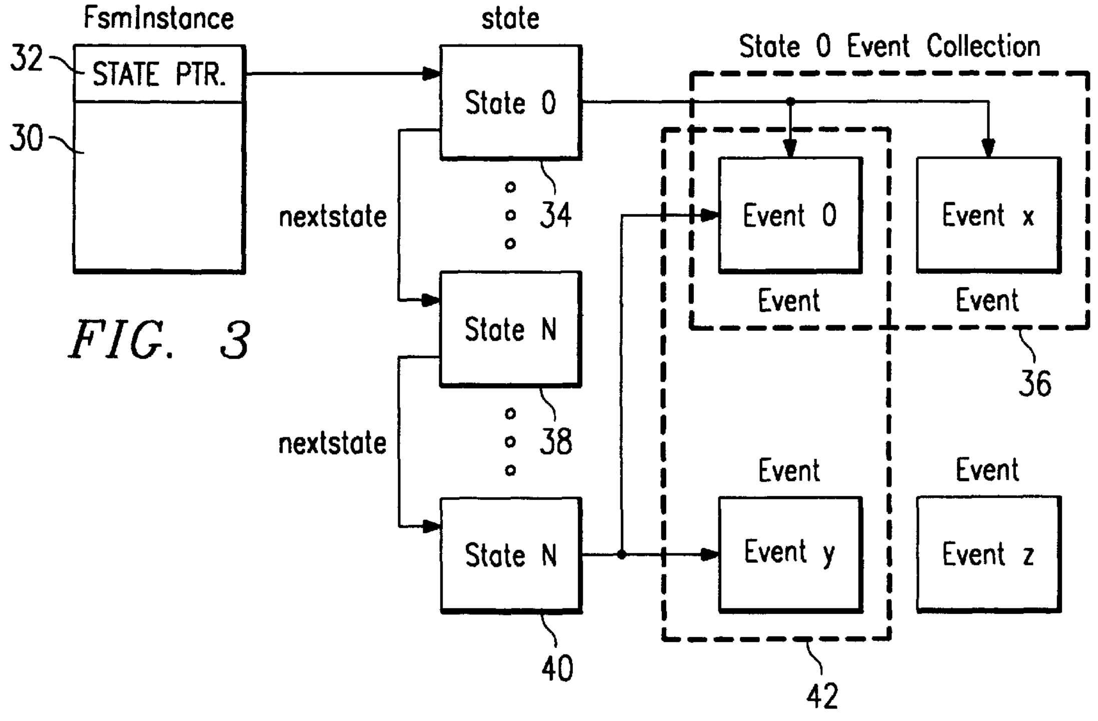
FIG. 3

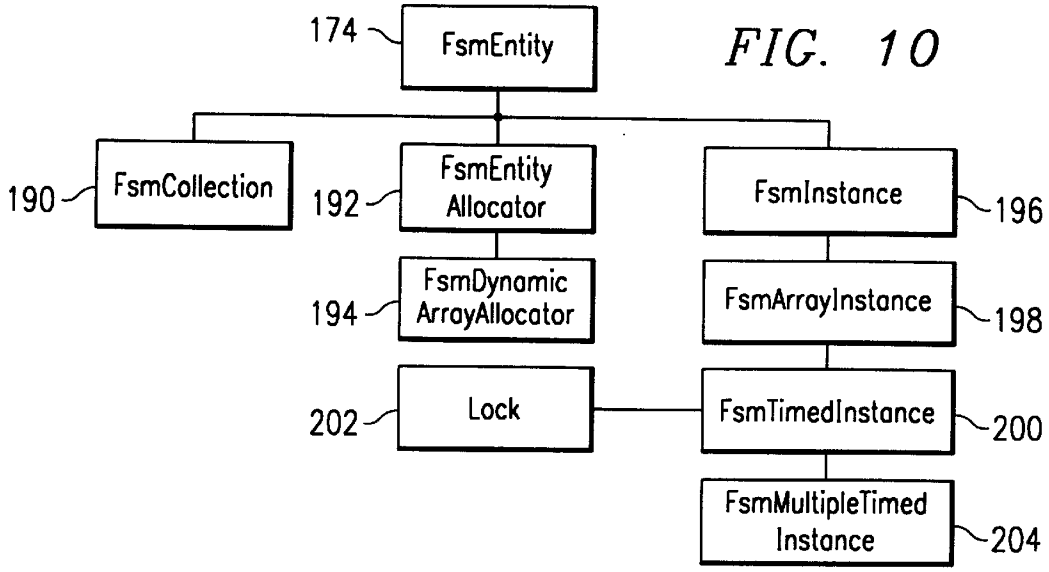
FIG. 10
FIG. 11
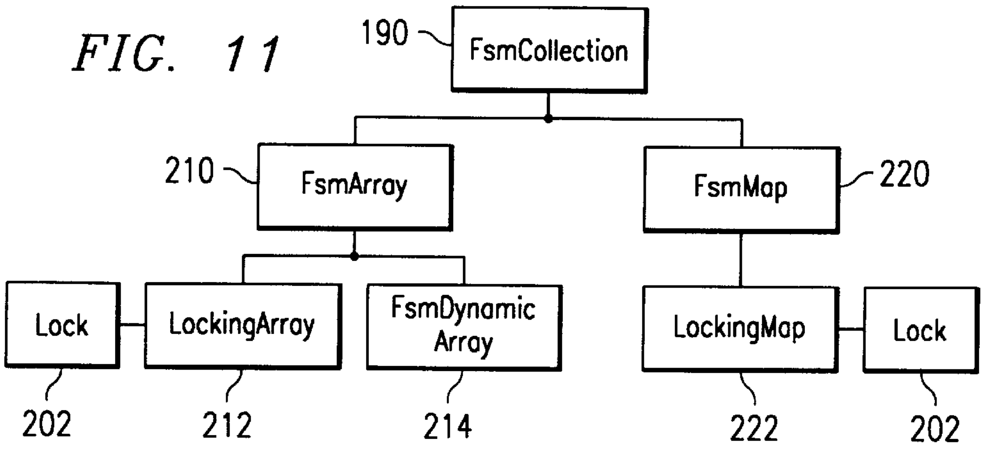
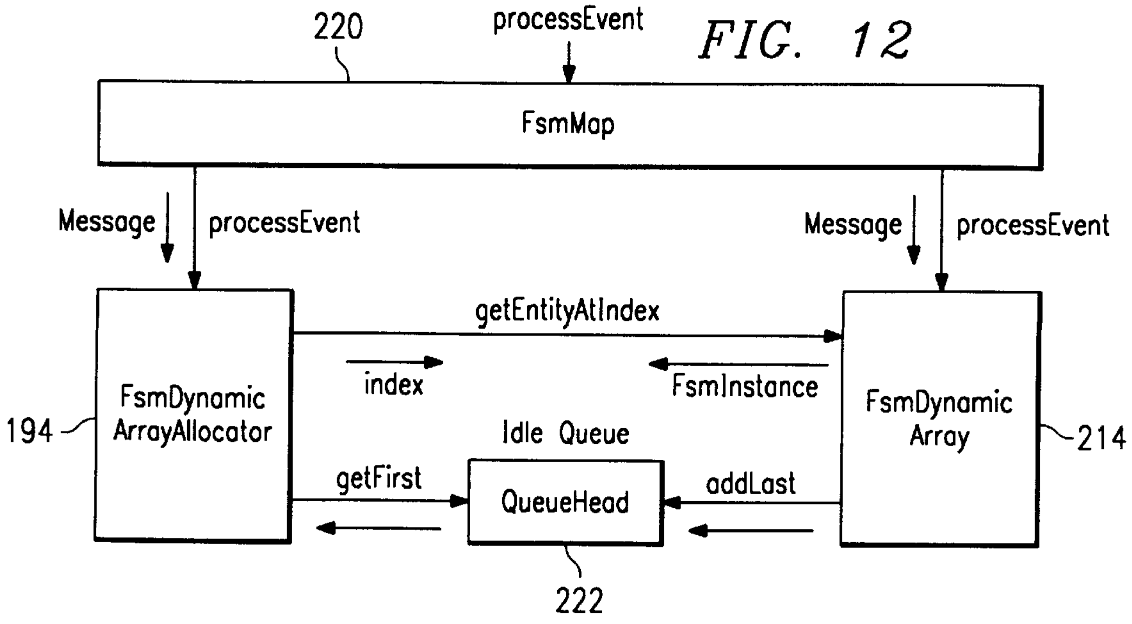
FIG. 12

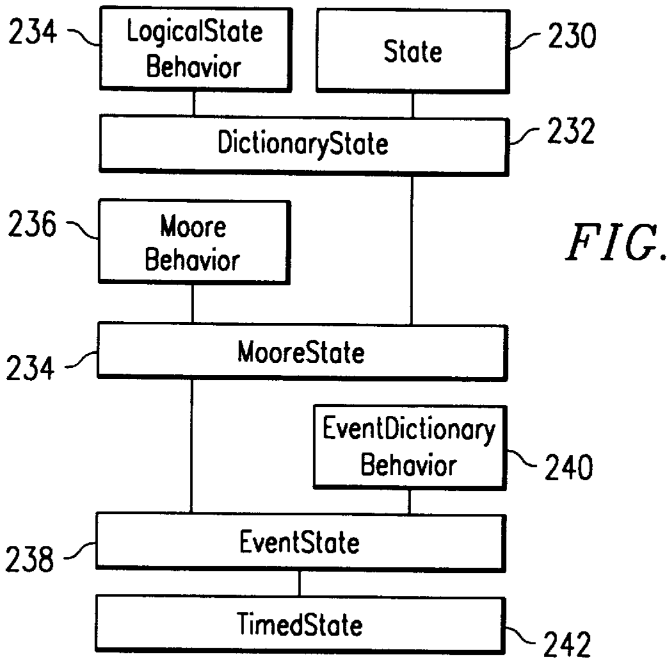
FIG. 13
FIG. 14
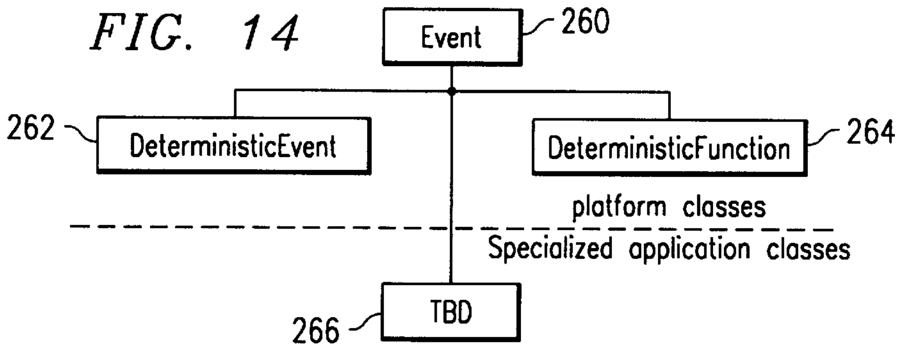
FIG. 15
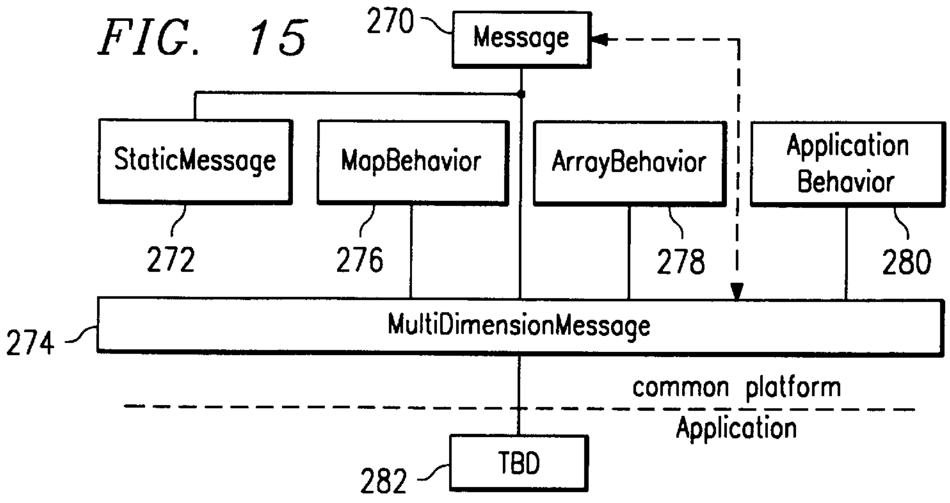

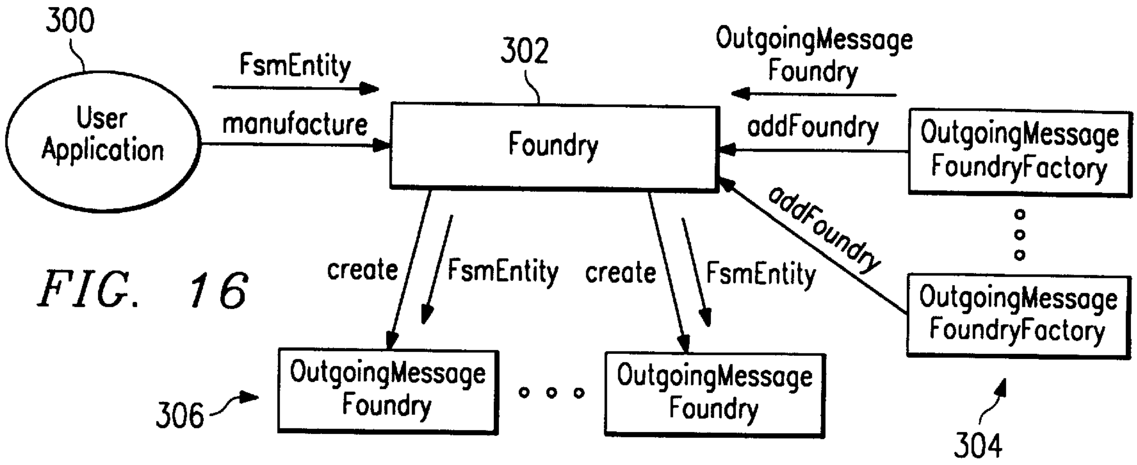
FIG. 16
FIG. 17
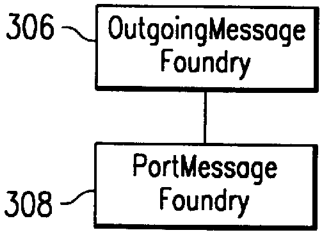
FIG. 18
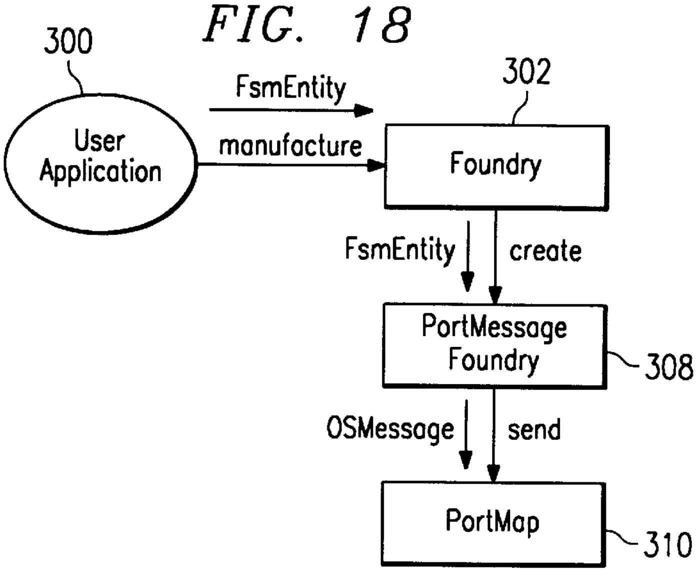
FIG. 19
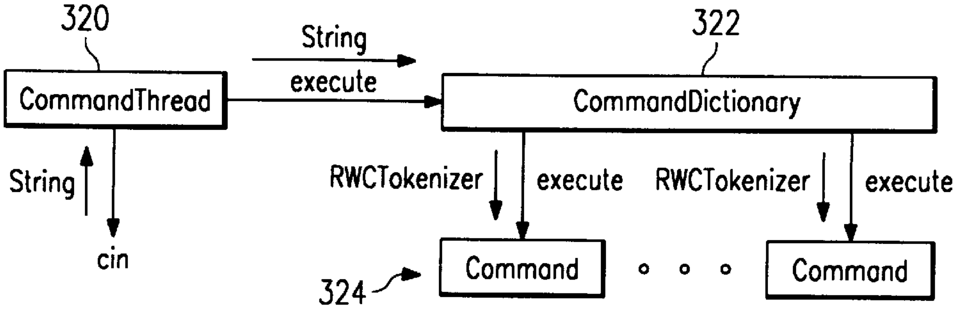

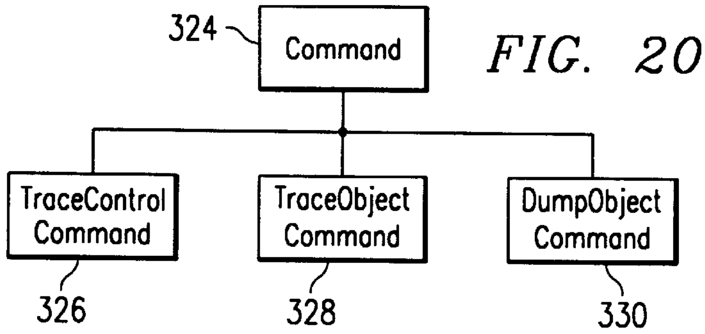
FIG. 20
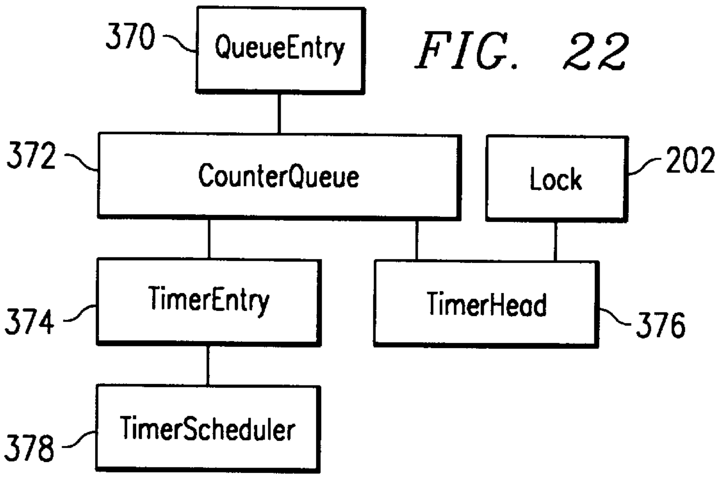
FIG. 22
FIG. 23
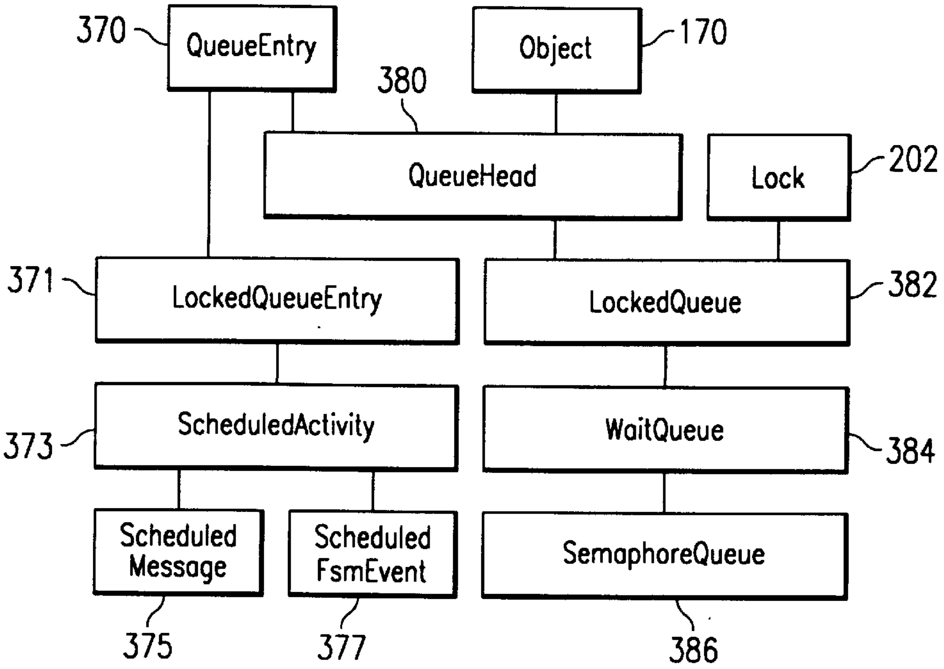

FIG. 29
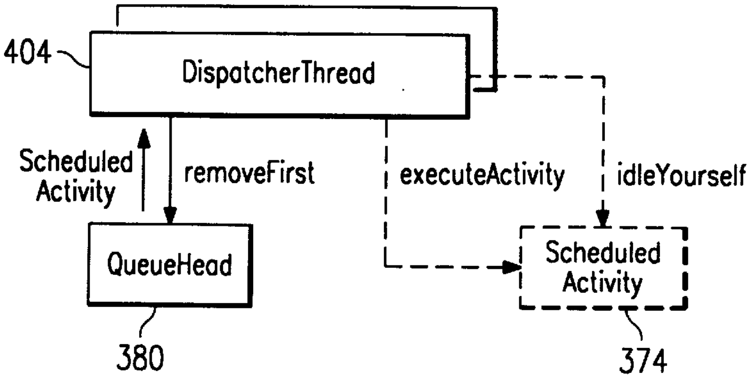
FIG. 30
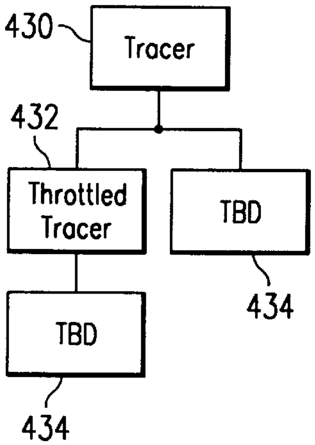
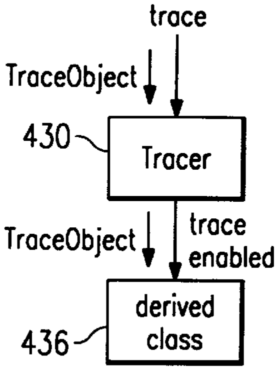
FIG. 31A
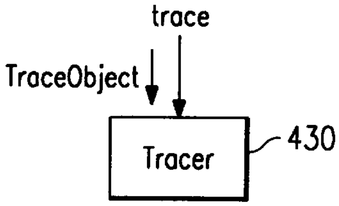
FIG. 31B
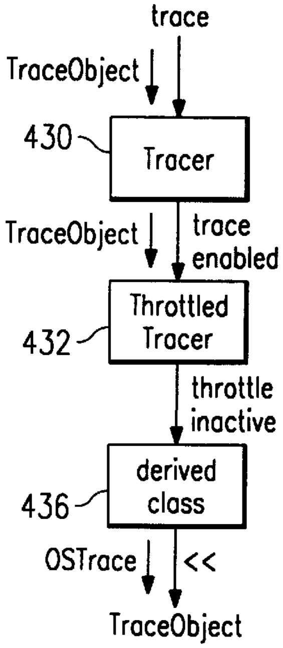
FIG. 32A
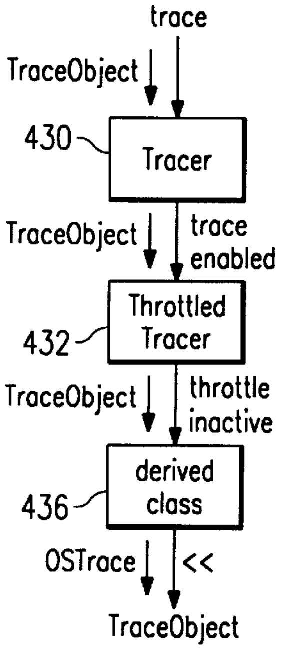
FIG. 32B
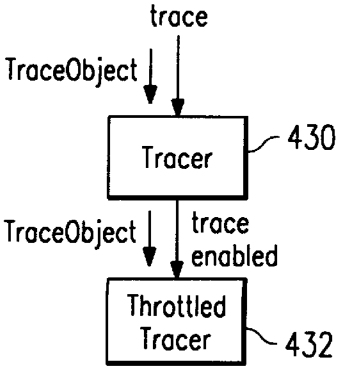
FIG. 32C

GENERIC SOFTWARE STATE MACHINE

RELATED PATENT APPLICATION

This patent application claims the benefit of U.S. provisional application Ser. No. 60/030,824, titled *Generic Software State Machine,* filed on Nov. 14, 1996.

This application is related to U.S. Pat. No. 5,995,753, titled *System and Method of Constructing Dynamic Objects for an Application Program,* filed on Nov. 12, 1997, which also claims the benefit of U.S. provisional application Ser. No. 60/030,824, titled *Generic Software State Machine,* filed on Nov. 14, 1996.

TECHNICAL FIELD OF THE INVENTION

This invention is related in general to the field of computer software. More particularly, the invention is related to a generic software state machine.

BACKGROUND OF THE INVENTION

Writing software applications for real world problems such as telephone switching communication protocols is an extremely complex procedure. Such software applications require a large number of hours to create, frequently are delivered with numerous problems, and are difficult to modify and support. The difficulty in creating and supporting large applications is primarily due to the inability of existing software development paradigms to provide a framework for simplifying the software development process. The complexity of the software has been shown to increase as an exponential function of the number of different operations that it is expected to process with current paradigms. A 1000 line program which might require one month to develop may be contrasted with a 2000 line program requiring six months or more of development effort. Large programming efforts have in the past almost beyond the capabilities of development in terms of reasonable performance, reliability, cost of development, and reasonable development cycles.

Object oriented technology (OOT) improves productivity whenever a problem can be simplified by decomposing it into a set of black box objects. Object oriented technology depends upon the benefits of data hiding, inheritance, and polymorphism to simplify a software design. If an application cannot be subdivided into objects, object oriented technology does not offer significant productivity improvements. Object oriented technology also does not address how to design the underlying behavior of an object which must change its behavior as a function of the order in which events come in. The underlying behavior of an object with this type of requirements is best designed using a finite state machine methodology.

The current state/event software strategy is to assign each step in processing a state number. A decision tree or table is used to route an event to a processing route that is specific for the current state and event. Neither a functional or object oriented design strategy reduces the complexity and amount of state/event processing software for the following reasons:

Deeply nested function calls are required to reduce the size of the program. This deep nesting obscures understanding of the operation of the system and further distances the software implementation from a graphical representation, such as a state diagram.

A single event can result in one of many possible state changes. The specific state is often a function of various status and database parameters. If the conditions required to make a specific state transition cannot be graphically specified as is the case with state as number paradigm, understanding of the state machine operations is obscured.

It is difficult to reverse engineer a complex finite state machine (FSM) implementation. The underlying state event relationships is best understood by a software engineer if expressed in a graphical drawing which shows states as bubbles or boxes and the events which result in transactions to new states as arcs between the states. This graphical representation cannot be found in the software implementation due to the fact that the software operations required to implement the state changes are distributed across all of the software. Therefore the initial software implementation must be manually coded from its graphical representation. Existing programs in which initial documentation has either been lost or is obsolete require an extensive process to regenerate the more intuitive graphical representation.

Modifications to software frequently introduce errors because the change failed to stop a timer or release a resource upon exit from a state. The state as number paradigm hides the facilities which are allocated.

Most implementations contain numerous event routines with similar but not quite identical behavior. The number of bugs in a system usually increases with the size of the software. Eliminating redundant code should improve the reliability of a system.

The state design usually results in a flat architecture (vs. hierarchical), which results in a complex design. Hierarchical state machines are natural solutions for some problems such as communication protocols but other problems require keen insight into the problem domain to permit decomposition into two or more hierarchy levels. Flat architecture is difficult to maintain for the following reasons:

The number of interconnections between states is large.

Redundant states with similar behavior interconnect with different states. Complex designs are more error prone than simpler designs.

Automatic generation and testing of the application state machine from a graphical specification is usually not practical due to the random nature of the processing performed and distribution of state changes.

All of the above factors makes it difficult to improve the productivity of the development of complex software. The object oriented paradigm cannot be used by itself to improve the quality and reduce the development cost of complex software state machines. Object oriented technology does not address the inner workings of an object's state/event code. The fundamental difficulty with the software state machine paradigm is that it models a state machine as a collection of state numbers and event routines.

SUMMARY OF THE INVENTION

Accordingly, it has become desirable to provide a way or a framework to develop complex software applications that makes them easier to understand, debug and test while still being efficient at use of real time. Further, it is desirable to provide a framework which allows a substantially direct conversion from a state machine diagram graphical representation to code. In particular, a state diagram modeled after the Meally or Moore state model may be easily transformed into re-usable code for the software application using the framework provided by the present invention.

Additionally, it is desirable to dynamically create the objects that implement the software application from a hierarchical set of configuration files. The configuration files may be modified easily to modify the resultant software application without having to relink and recompile the code. It is also desirable that no loss of real time performance result from the ability to dynamically create objects at run time. In this manner, the software implementation process is further streamlined.

In an aspect of the present invention, a generic software state machine includes a set of state objects defined for each software element representative of states that the software element may enter, and a set of event objects defined for each state object representative of inputs that the software element may receive or actions the software element may encounter while in the state represented by the state object.

In another aspect of the present invention, a generic software state machine for implementing a software application in an object oriented environment includes a set of entity objects defined for software elements of the software application, a set of state objects defined for each entity object representative of states that the software element may enter, and a set of event objects defined for each state object representative of inputs that the software element may receive or actions the software element may encounter while in the state represented by the state object.

In yet another aspect of the present invention, an object oriented method of implementing an application software by a generic software state machine includes the steps of encapsulating a software element as a entity object, encapsulating the states of the software element as a plurality of state objects, and associating the entity object to one of the plurality of state objects indicative of a current state that the software element is in. Thereafter, an input is received, the current state association of the entity object is changed to a new state object in response to the received input, and the received input is processed by the new state object.

An important technical advantage provides the state as object paradigm embodied in the framework of the present invention. Following this state as object paradigm, a software application that has been designed in terms of a Meally or Moore state diagram may be easily converted to code with re-usable object classes. Because the state is embodied in an object, that state object class is reusable to provide many instances thereof in software implementation. Further, in a Moore state diagram, for example, the states in the state diagram may be easily mapped to state objects, and the arcs in the state diagram may be easily mapped to event objects. Similarly, to reverse engineer a software application constructed using the framework of the present invention may be easily done by mapping the state objects to states in a Moore state diagram, and mapping the event objects to arcs in the diagram. Therefore, the process of coding complex software application is greatly simplified and streamlined, resulting in increased productivity.

Further, because the objects are specified in configuration files, code modifications and changes typically do not entail relinking and recompiling the code and may be done on-line at run time. Because the configuration files and the factory objects are organized independently and in a hierarchical manner, changes may be made to one without affecting the others. Run time efficiency of the application software is also achieved by creating the dynamic objects from object classes that are implemented in a compiled high level language, such as C++, rather than an interpreted language.

BRIEF DESCRIPTION OF THE DRAWINGS

For a better understanding of the present invention, reference may be made to the accompanying drawings, in which:

FIG. 1 is a simplified block diagram of a software state machine according to an embodiment of the present invention;

FIG. 2 is a simplified block diagram of state as objects according to an embodiment of the present invention;

FIG. 3 is a State context diagram according to an embodiment of the present invention;

FIG. 10 is an FsmEntity class inheritance diagram according to an embodiment of the present invention;

FIG. 11 is an FsmCollection class inheritance diagram according to an embodiment of the present invention;

FIG. 12 is a dynamic array context diagram according to an embodiment of the present invention;

FIG. 13 is a State class inheritance diagram according to an embodiment of the present invention;

FIG. 14 is an Event class inheritance diagram according to an embodiment of the present invention;

FIG. 15 is a Message class inheritance diagram according to an embodiment of the present invention;

FIG. 16 is a foundry objects context diagram according to an embodiment of the present invention;

FIG. 17 is an OutgoingMessageFoundry class inheritance diagram according to an embodiment of the present invention;

FIG. 18 is a PortMessageFoundry class context diagram according to an embodiment of the present invention;

FIG. 19 is a command class context diagram according to an embodiment of the present invention;

FIG. 20 is a command class inheritance diagram according to an embodiment of the present invention;

FIG. 22 is a Timer Queue class inheritance diagram according to an embodiment of the present invention;

FIG. 23 is a QueueHead class inheritance diagram according to an embodiment of the present invention;

FIG. 29 is an DispatcherThread class context diagram according to an embodiment of the present invention;

FIG. 30 is a Tracer class inheritance diagram according to an embodiment of the present invention;

FIGS. 31A and 31B are execution flow diagrams of Tracer according to an embodiment of the present invention;

FIGS. 32A though 32C are execution flow diagrams of ThrottleTracer according to an embodiment of the present invention;

DETAILED DESCRIPTION OF THE INVENTION

Figure 4:
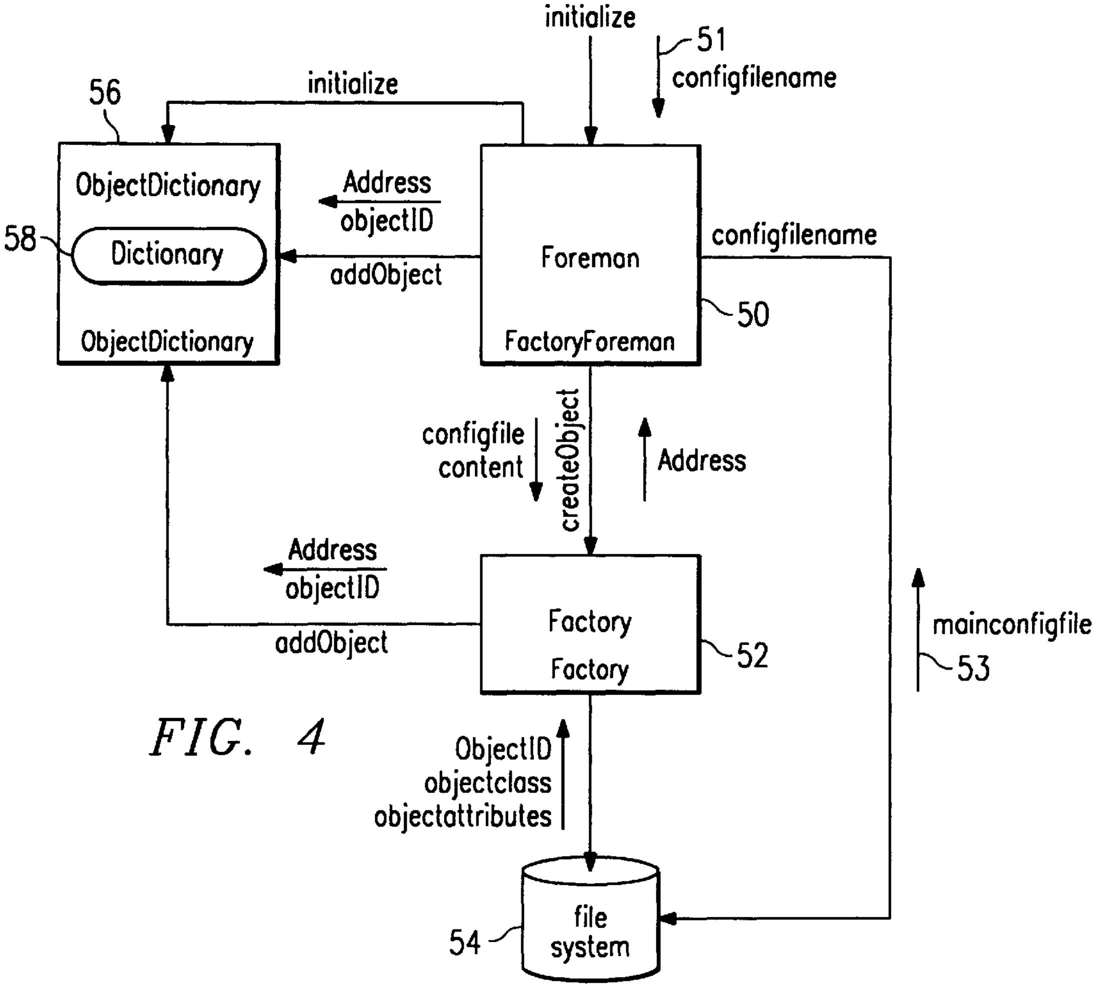
FIG. 4 is a context diagram of the initialization process in which application objects are manufactured according to an embodiment of the present invention.

The preferred embodiments of the present invention are illustrated in FIGS. 1–39, like reference numerals being used to refer to like and corresponding parts of the various drawings.

Extremely complex hardware state machines are typically implemented via microprogramming. Microprogrammed hardware state machines simplify the complexity of the hardware and reduces the number of components. Microprogrammed hardware state machines are typically constructed using memory which is subdivided into fields, where each memory field controls the operation of a subset of the hardware. Microprogrammed hardware state machines are very regular, and easy to modify where changes are required only to contents of the memory. The state of the hardware state machine is the address of the current micro-instruction in the memory. Hardware state machines typically provide outputs as a function of the current state. The next state a hardware state machine enters is totally determined by the current state and the input data. Software state machines can emulate the hardware paradigm, by associating the outputs (messages, status and hardware changes) with the current state rather than the transient associated with the event. A key part of the invention is that the state of an object is transformed from a number to an object with properties and behavior. For an object to easily adapt its behavior, the state of an object should be a static object related to the original object by association. The object changes state by changing its association to a different object. Polymorphic behavior to events is handled by assigning the state object to process the event.

FIG. 1 is a block diagram of an exemplary software microprogrammed state machine 10 which may be based on a state as number paradigm or state as object paradigm. If it is based on state as number paradigm, the state machine is not re-usable because application specific behavior such as incoming message formats and attributes cannot be isolated from the common behavior. Attributes 0 to (N−1) are the actions that software state machine 10 may perform, such as timer value, hardware state, and message to send. From these attributes, outputs are produced. In software state machine 10, abstract interfaces of receiving an event, processing the event, entering a state, and exiting a state may be defined in a set of object classes which do not contain application specific code. These classes are re-usable as the starting point to implement application programs. The programmer defines the attributes in a derived state that are required for the application and implements the entry and exit handlers. The entry and exit handlers correspond to the random logic in a hardware state machine which is driven by the contents of the microprogrammed memory. A graphical user interface (GUI) tool may be used to build application programs by creating instances of states and other objects in a diagrammatical manner, interconnecting them, and fill in the required attributes.

In particular the programmer may begin implementing the software application by first designing a set of hierarchical state diagrams. Following the Moore model, the states are drawn as bubbles connected by arcs that represent inputs or events that cause state changes. The state as object paradigm enables the programmer to easily transform this graphical specification of the software application to code by converting the states in the diagram to state objects and arcs in the diagram to event objects. Reverse engineering is also simplified by the state as object paradigm. The state objects in the application software may be transformed into bubbles in the state diagram and the event objects may be transformed into arcs connecting the bubbles.

FIG. 2 is a simplified block diagram the states as objects paradigm according to an embodiment of the present invention. Standard object oriented programming does not account for an object changing its behavior as the result of receiving an event. Polymorphism in languages such as C++ allows different objects to respond uniquely to an event but does not provide for individual objects changing their behavior with time. The finite state machine instances, its set of states, and event handlers can be considered an extended object in that all of them are required for the higher level entity to implement its behavior. In the state as object paradigm, an object 20 is used to encapsulate the data and methods of a state. When a particular event 22 is encountered by object 20, object 20 is associated with a specific state object N 26. Object 20 may change states by changing its association to different state objects 26. Polymorphic behavior to events is handled by assigning state object 26 to process event 22.

A set of state/event classes has been developed based on the paradigm of states as objects. The operations required to enter a state are removed from event functions and placed in entry functions associated with the state. Entry processing is triggered automatically as the result of entering a state. Associating processing with a state rather than an event allows all common processing required to enter the state to be centralized and encapsulated in the state object. Further, certain functions such as the establishment of a timer upon entry to a state, are better performed by the state than an event function since the timer must be established no matter what event triggered the transition to the state. Otherwise, every event function that results in a transition into a state must perform the required processing.

The operations required to exit a state are also removed from event functions and placed in entry functions associated with the state object. Exit processing is triggered automatically as the result of leaving a state. Exit processing such as stopping a timer that was established upon entry to the state is frequently required. Even event function that results in exiting a state usually must perform the same exit processing. Automating the cancellation of the timer significantly simplifies event functions. By automating exit processing, fewer bugs are introduced as a result of failure to perform an exit function in an event routine.

In the software state machine, attributes which mimic the operation of micro-programmed state machines are permitted in the execution of the user implemented entry and exit behavior. Event, entry and exit functions can be combined when state dependant data is removed. The object oriented state machine abstracts the state such that each application adds attributes as data items as required to fit the application requirements.

In software state machine 10, state objects are allowed to be either stable or transient. Stable state objects add behavior for processing external events and objects can remain in a stable state between occurrences of events. Transient states are only entered to perform an operation that is coincident with the processing of the event. Transient states can be used to reduce the depth of function calls in event routines by chaining transient states. For example, each transient state performs on entry the operations required at a function call. Multiple exits from the transient state are permitted. The use of transient states simplifies the processing that is required for a specific state transition but increases the complexity of the state diagram.

In software state machine 10, explicit state changes may not be made by the event function. Event functions are allowed only to indicate logical state changes which are translated into the appropriate physical state. Event functions that would normally differ by the respective state changes can be merged into common routines.

In software state machine 10, the topology of the state transitions is located within state objects rather than within the application functions. Therefore, the task of maintaining and deciphering the state topology is simplified since the engineer is no longer required to step through program code to determine which state transitions are defined for a state.

In software state machine 10, the responsibilities assigned to event functions are limited to processing the received event and determining if a logical state change is required. Thus, fewer and simpler event functions are required.

In software state machine 10, the internal structure of incoming events are encapsulated. All incoming events may enter as state message objects or are transformed at the front end to an object such that all accesses to data items is performed via member functions.

In the software state machine paradigm, support for hierarchical or interacting state machines are also provided. Events are routed to the state machine which has been delegated responsibility for processing it. Transmission of messages internally between state machines is supported. The relationship between any two state machines may be either hierarchical with higher level events processes by the top level state machine and lower level events processed by the bottom level state machine. Communication between the two levels of state machines is via internal events. Any two state machines may also have a functional relationship, where each state machine is assigned responsibility for a separate set of events and the two state machines interact by sending each other events as required. The exchange of events is an efficient transaction. Direct process message member function calls are allowed between state machines.

Referring to FIG. 3, a simplified context diagram of a state class. An instance 30 of an FsmInstance (finite state machine instance) object class has a state pointer 32 which points to an instance 34, state 0, of its current state object. State 0 34 defines the behavior of FsmInstance 30 in terms of the events 36 that FsmInstance 30 may respond to while in the current state, actions performed in the current state, and a next state 38 that FsmInstance 30 may enter. Thus, state objects 34, 38 and 40 represent the states that FsmInstance object may enter and also define a collection of events 42 that FsmInstance 30 may anticipate while in states 34, 38, and 40.

Referring to FIG. 4, a block diagram of a software state machine initialization process is shown. All objects in an application built pursuant to the software state machine paradigm are created via reference to a configuration file. Upon initialization, a Foreman object 50 is provided a specific configuration file name 51, such as a main configuration file (MainConfig). The configuration file specifies and defines a set of top level objects which need to be created by a Factory object 52 at the request of Foreman 50. Foreman 50 retrieves MainConfig file 53 from a file system or database 54 and passes the contents of the configuration file to Factory 52. Each object specified in the configuration file may have an associated configuration file or files which further specify how the objects should be constructed.

Foreman 50 assumes all of the object building responsibilities. It is responsible for constructing the system in preparation for start-up. Foreman stores the ObjectID and object address of each created object in the objectDictionary. The factory object may reference a hierarchy of objects in the creation of the requested object. The Foreman constructs the system in two steps:

1. All objects are created and stored in the objectDictionary. At this stage, objects are linked by ObjectID.
2. The objectDictionary initialize method is called.

The dictionary iterates through all objects executing their initialize method. All objects should translate ObjectID references into physical object addresses.

Figure 5:
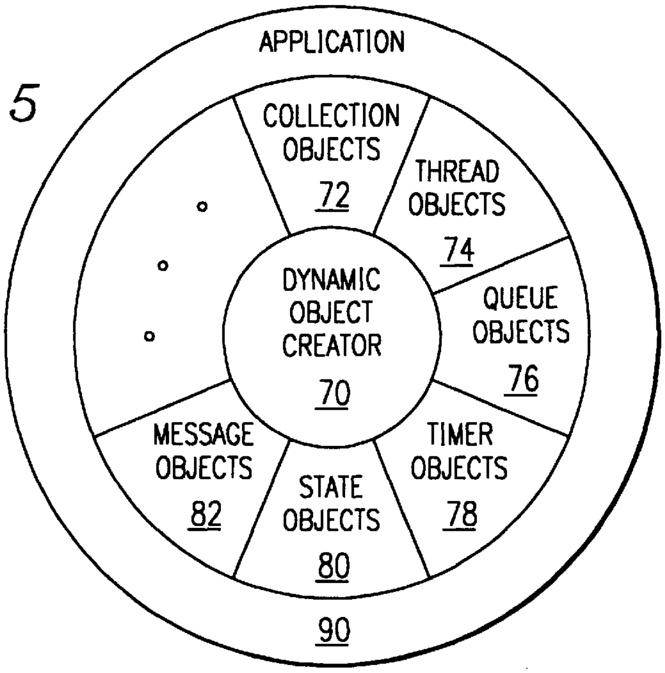
FIG. 5 is a diagram of the basic layered architecture of the software state machine according to an embodiment of the present invention.

Factory 52 contains a set of Factory objects. Each Factory object possess the knowledge to construct an instance of a particular class of objects. Referring also to FIG. 5, Foreman 50, Factory 52, and other objects are part of a dynamic object creator 70. One instance of a Factory object is created in the Factory object constructor for each type of object that can be dynamically constructed. Dynamic objects that may be created by dynamic object creator 70 includes collection objects 72, thread objects 74, queue objects 76, timer objects 78, state objects 80, and message objects 82, for example. Application programs 90 are built on top of the dynamic objects 72–82 constructed by dynamic object creator 70 and utilize these dynamic objects to perform needed functions. Therefore, factory 52 may be unique to each application to create different sets of dynamic objects suited to each application. The dynamic objects of the application program are generally created in two steps.

Referring again to FIG. 4, Factory 52 creates all objects by retrieving the object identifiers (ObjectID), object classes, and optional object attributes of the object classes enumerated in configuration file 53. Factory 52 then provides the addresses of the created objects to Foreman 50 and the addresses and object identifiers of the created objects to an ObjectDictionary 56, which maintains a table or database for storing them. A dictionary object 58 within ObjectDictionary 56 is then instructed to initialize all objects stored in ObjectDictionary 56 via its initialize member function. Dictionary 58 iterates through all of its stored objects calling their member functions. References between the created objects are then cross linked. ObjectDictionary 56 is a static object that is visible to all dynamically created objects. Its dictionary 56 maps object identifiers to the address of the corresponding object. Foreman 50 is only active during the initialization phase and is responsible for managing the creation of the top level objects in the passed configuration file.

Constructed in this manner, an application program can be modified quickly by changing the configuration files without recompiling and relinking the code. Configuration files may be written in TCL, however a script language or even ASCII may be used to specify the list of configuration file names that stores object specifications.

Figure 6:
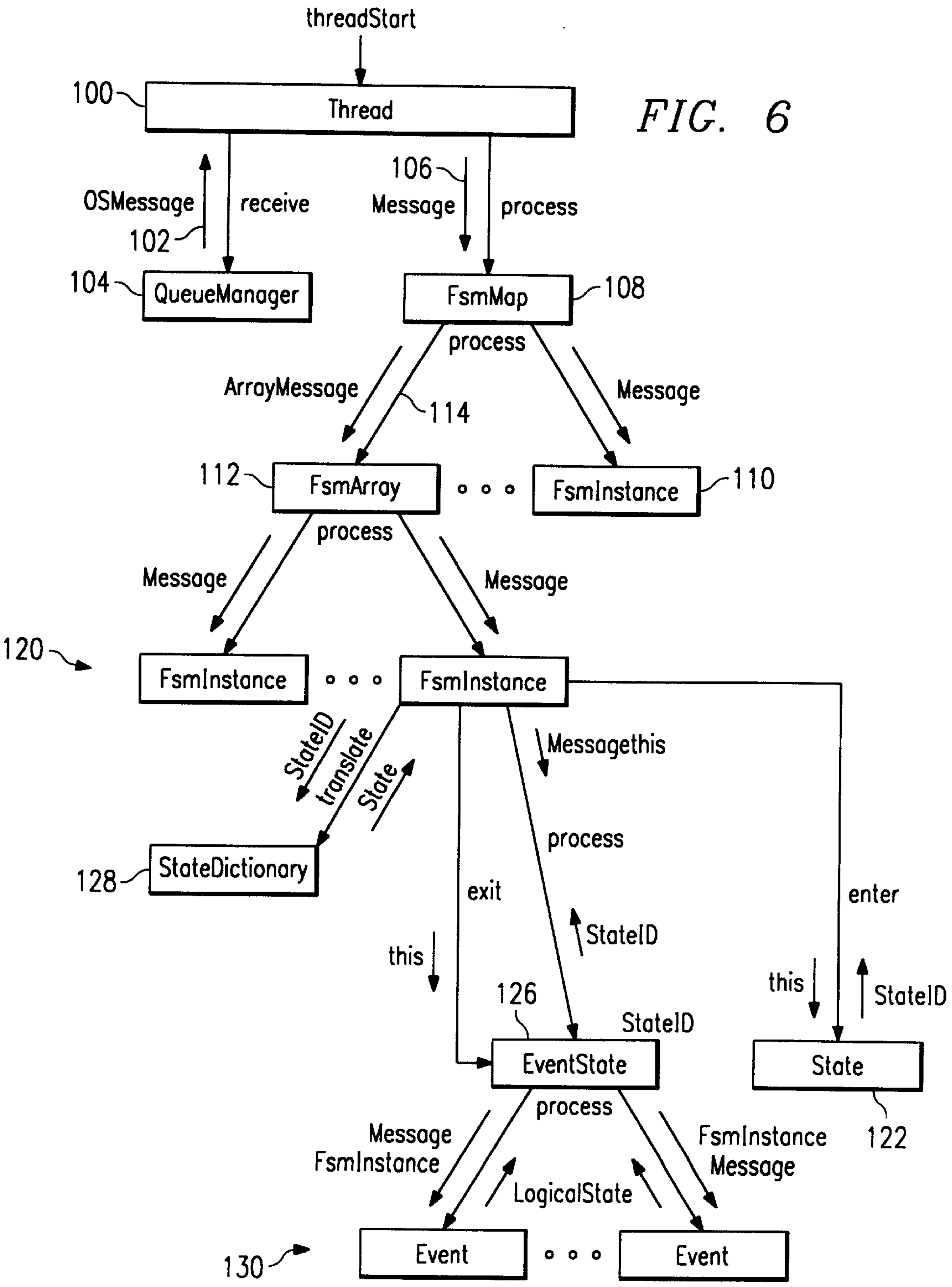
FIG. 6 is a State Machine context diagram according to an embodiment of the present invention.

FIG. 6 is a class context diagram of certain framework classes of the software state machine architecture. FIG. 6 illustrates the context relationship of the software state machine classes which execute in the context of one or more Thread abstract classes 100. Thread 100 is an abstract class that is the central object in the software state machine. An abstract class is a class which has one or more pure virtual functions, which are defined but unimplemented in the abstract class. Therefore, instances cannot be created directly from an abstract class. An abstract class is used to derive additional classes, which contain implementations of the pure virtual functions. Thread 100 receives OSMessages (operating system messages) 102 from a QueueManager instance 104, converts them to Message object instances 106 and sends them to an FsmMap instance 108. Message 106 is an abstract class that defines the interface for obtaining the identity of a message. FsmMap instance 108 interrogates Message instance 106 for its symbolic message identifier and translates or maps it into the address of an FsmInstance 110 assigned responsibility for processing the message. Incoming state machine messages may be processed by a single FsmInstance object 110 or an FsmCollection object, which is shown in FIG. 5 as an FsmArray object 112 receiving an array message 114.

FsmArray object 112 interrogates state machine array message 114 for an FsmInstance identifier, which is translated into one or more specific FsmInstances (or collection) 120 that is assigned responsibility for processing the message. FsmInstance 120 manages the processing of the message. Each FsmInstance 120 contains its current state identifier and the address of the state 122 which specifies the processing of the message. FsmInstance 120 calls the state's process event member function. If state object 122 returns a new state identifier, FsmInstance 120 then:

1. calls the current state's exit member function;
2. calls the next state's enter function; and
3. repeats step 2 if the enter function from step 2 returns a state identifier. Instances of an Event State object 126 contain a StateDictionary 128 of the events that are defined for this state. The received state machine message is interrogated for its symbolic message identifier which is translated into the address of one or more target Event 130. Event State object 126 passes the state machine message and the FsmInstance object to Event 130. Event instance 130 returns a pointer to a LogicalState instance when a state change is required. Each Event state 126 instance is derived from a StateDictionary class 128 and therefore also has a logical state dictionary. Class StateDictionary 128 manages collections of states and contains member functions for adding a state to its collection and converting a SstateID into the address of its associated state. Each instance of StateDictionary contains two dictionaries: __initDictionary contains StateID to ObjectID pairs; __stateDictionary contains State addresses which are translated by the ObjectDictionary from the __initDictionary.

Event State 126 then translates the LogicalState returned by Event 130 into a state identifier (StateID), and further translated into the address of the associated State object 122, which is returned to the caller of its process event member function.

The general configuration file parameters for each class is the following:

set ObjectAttributes(0,ObjectClass) ClassName set ObjectAttributes(0,ObjectID) ObjectID set configFiles(0,fileName) fileName1.config set configFiles(1,fileName) fileName2.config set ObjectAttributes(0,traceState) DISABLED Exemplary required parameters may have the format:

__stateID Initial State Name set ClassNameAttributes(0,ClassNameState) StateID

__stateDictionaryID address of dictionary for translating StateID instances set ClassNameAttributes(0,FsmStateDictionary) ObjectID ClassName referenced above is the name of the class, which is to be substituted therein.

Figure 7:
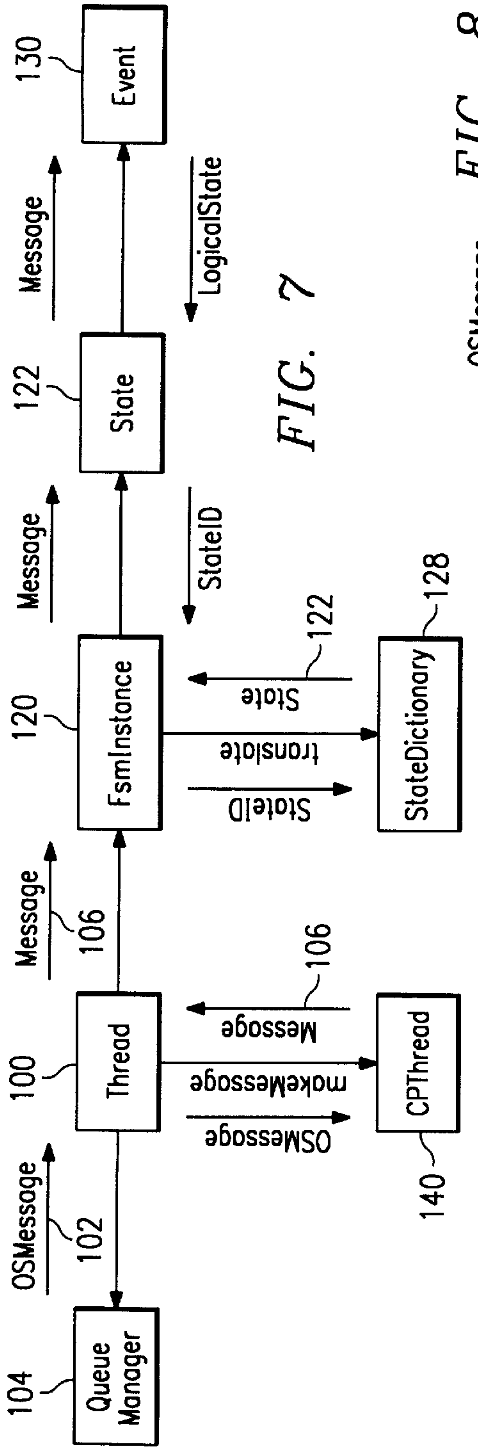
FIG. 7 is a logic flow diagram of message processing in the software state machine according to an embodiment of the present invention.

FIG. 7 is a diagram that further illustrates the logical flow of an OSMessage 102 from a QueueManager instance 104 until it is processed by an Event object 130. A derived class CPThread 140 creates call processing message instances and returns them cast as Message instances. FsmInstance 120 translates state identifier (StateID) values that it receives back from an Event State instance (which is a derived class of state dictionary 128) into the address of the associated state 122. The state machine architecture allows substituting alternate state machine models for specific instances of FsmInstance where the collection of states may differ by as few as one state instance.

Figure 8:
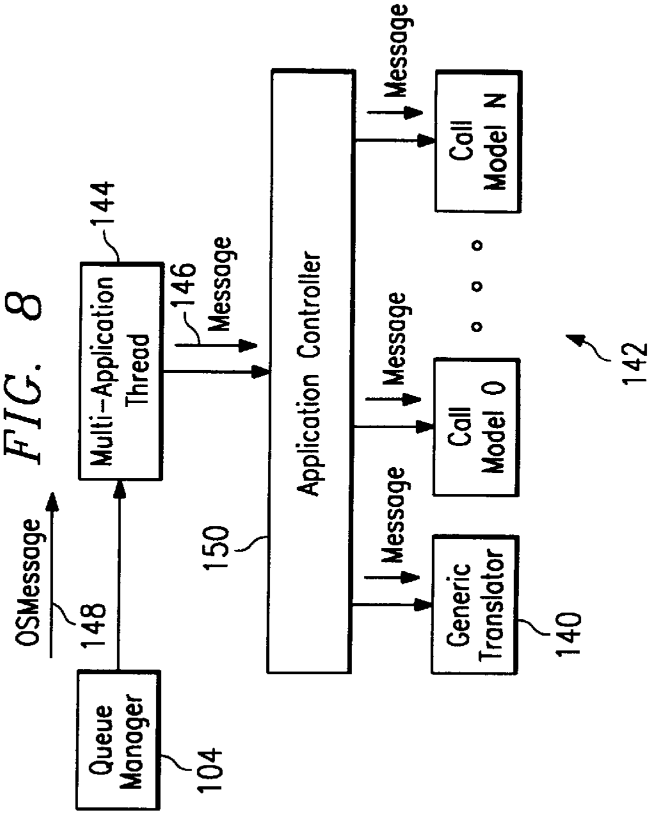
FIG. 8 is a diagram of a multi-application example according to an embodiment of the present invention.

Referring to FIG. 8, a block diagram of a multi-application example is shown. In a telecommunications call processing application program, there may exist a software state machine application for a generic translator 140 for translating call processing co-residing with a number of call models 142. A Multi-application Thread object 144 creates Messages 146 from OSMessages 148 received from QueueManager 104. Multi-application Thread 144 forwards the Message to an application controller object 150, which routes Messages 146 to the appropriate application. Multi-application Thread 144 inherits its data and functions from Thread object class 100, and Application Controller 150 inherits from an FsmCollection (multiple FsmInstance object 120) object class.

Accordingly, to achieve the functionality of the software state machine an exemplary set of class hierarchies has been designed. Some of these class hierarchies have been briefly described above and summarized below:

All received messages are derived from a Message class which hides all application detail from the software state machine.

A Thread class is created which defines a pure virtual function for translating OSMessage instances into compatible Message instances.

An FsmMap class supports individual finite state machine instances as well as collections of finite state machine instances.

An FsmEntity class is the abstract interface between the software state machine and call blocks.

A State class defines the abstract behavior for entering, exiting a state and processing an event.

New state classes, dictionary state and configurable state, support logical state changes. The user is responsible for defining the set of logical state variables and the mapping within each state of logical state to physical state identifier.

Event class hierarchy supports processing of a specific event for a state.

These object classes are discussed in more detail below.

Figure 9:
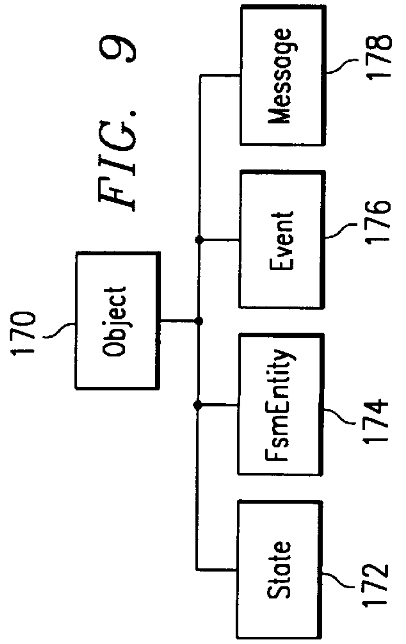
FIG. 9 is an inheritance diagram of Object classes according to an embodiment of the present invention.

Referring to FIG. 9, an Object class inheritance diagram is shown. In the software state machine, all objects which can be created from a configuration file by dynamic object creator 70 (FIG. 5) are descended from a base class, Object class 170. Since objects are created and initialized during the initialization phase of the process (shown in FIG. 4), Object class 170 provides the interface for accessing and initialized objects stored in ObjectDictionary 56 (FIG. 4). From Object class 170, State object class 172, FsmEntity object 174, Event object class 176, and Message object class 178 are derived. Objects of the type Object must override the base implementation of the following exemplary methods:

1. init—resolve all ObjectID references into physical object addresses using ObjectDictionary;
2. start execution—perform any post initialization processes such as creating a thread;
3. string stream—the object must dump all of its data attributes into a human readable ASCII format; and
4. get class—returns a String instance which uniquely identifies the class of the object.

Object class 170 is an abstract class which defines the interface for object initialization. As described above, initialization is a two step process of construction and resolving object addresses. After the initialization process, execution begins. It is ObjectDictionary's task to execute each object's init member function. The init member function is a virtual function which is used to trigger the derived object to initialize itself. The object translates all ObjectID references into physical object addresses to allow it to directly access the destination objects. Therefore, each object which can reside in the ObjectDictionary must be derived from a Dictionary object class. Because Object class 170 is an abstract class, no instances thereof can be created.

Referring to FIG. 10, a class hierarchy diagram of an FsmEntity object class 174 according to the teachings of an embodiment of the present invention is shown. FsmEntity class 174 generalizes the behavior of receiving and processing messages by defining a processEvent member function which is a pure virtual function that defines the interface for receiving messages to be processed. An FsmEntity can be a simple object such as an FsmInstance or it may be a collection of entities such as FsmCollection, described below. Instances of FsmEntity are linked to a parent entity via its -parentEntity attribute.

FsmInstance 196 inherits the message interface behavior from FsmEntity 174 and is the base class for state-oriented objects which an application may define, such as call block objects in a telecommunications call processing application. The fundamental object in a telephony application is the call block. It contains the current state of the call for a specific trunk circuit and provides storage for accumulated incoming digits. FsmInstance object class 196 does not contain any application specific behavior or attributes, but instead defines the common behavior for an object which has a state. Application specific objects such as call blocks may be derived from FsmInstance class 196. FsmInstance 196 has an attribute, __state, which defines the current state of the object instance, and another attribute, __stateMachine, which contains the address of the StateMachine which is used to translate StateIDs into State object instances. When its member function processEvent is called, the received Message is passed to the state through its processEvent member function. This member function returns a pointer to StateID if a state change is required. FsmInstance then issues a request to StateMachine instance to translate the StateID into the address of the state object, calls first the current state's exit member function and then the next state's enter function. FsmInstance further includes a setStateID member function that is a public function used to set the initial StateID, which must be called by FsmInstanceFactory object before the init function is called. Another public function, setStateDictionaryID, sets the objectID of the state dictionary, which must be called before init is called.

FsmArrayInstance class 198 inherits from FsmInstance 196, and defines the state processing behavior for a an array of FsmInstance. FsmArrayInstance 198 may have the same member functions and attributes as FsmInstance 196.

FsmTimedInstance class 200 inherits from FsmArrayInstance 196 and provides support for a timer that is automatically started or stopped upon entry to a state. FsmTimedInstance 200 defines two pure virtual functions, startTimer and stopTimer, to start and stop timers upon entry and exit of a state, respectively. FsmTimedInstance 200 further includes a public function, processTimeout, which provides the entry point for timeout events from the timer. Member function processTimeout has the following logic flow:

1. issue a Trace message if enabled
2. if a state was returned (indicative of a state change about to occur) then translate the StateID of the next state into an address of the object
3. if tracing is enabled, issue a trace message
4. exit current state
5. if tracing is enabled, issue trace message
6. enter next state Lock 202 is a class that encapsulates the locking mechanism of the operating system to isolate the operating system from the application software. Many classes use Lock 202 as a mix-in parent class.

FsmMultipleTimedInstance 204 is a class that allows multiple timers to be in progress simultaneously for one FsmInstance. FsmMultipleTimedInstance 204 inherits from FsmTimedInstance 200 and adds member functions for adding a timer to the allowed timer set, and starting or stopping a specific timer. It is the responsibility of the application program to start and stop the timers maintained in a map, __timerMap, which has the addresses of the timers in the allowed set of timers. Unlike the timer defined by parent class FsmTimedInstance, none of these timers are started or stopped automatically by the base state classes upon entry or exit to a state. FsmMultipleTimedInstance 204 includes a startMultipleTimer member function, which has the following logical flow:

1. get address of timer from __timerMap
2. if timer not present in __timerMap, print error trace message and return
3. activate timer
4. return Similarly, a stopMultipleTimer member function, accesses __timerMap to obtain the address of a specific timer and deactivates it when it is called. A member function, addMultipleTimer, may be called to add a timer to the set of timers and update the __timerMap with its address.

FsmEntityAllocator 192 is another class that inherits from FsmEntity 174. FsmEntityAllocator 192 is an abstract class which defines the behavior for a set of one or more FsmEntity. A preProcess pure virtual function allows a derived class to perform any processing on an allocated FsmEntity prior to giving it the message for processing. Class attributes include an IdleQueueID, which points to the set of unallocated FsmEntity that is available for allocation.

Similarly, class FsmDynamicArrayAllocator 194 inherits from FsmEntityAllocator 192 and further defines the behavior for allocating an FsmInstance from an FsmArray. An idle queue is also used to organize the set of unallocated and available FsmInstances.

The behavior of collections of FsmEntity are defined by an FsmCollection class 190, which abstracts the behavior of an arbitrary set of FsmEntity. FsmCollection 190 defines the interface for adding or removing FsmEntity to or from the set. Collection classes may have a dynamic/static attribute, where itself and its child may be static, itself may be static and its child may be dynamic, or itself and its child may both be dynamic. Collection classes may also be non-locking or locking during event processing. Further, an index attribute of the collection classes may indicate whether MessageID is used as an index or the message may contain an index. Collection classes may also be of the type that uses a map for identifying its children or uses an array for its children. Accordingly, the naming convention of a collection class may be:

Fsm<DYNAMIC><LOCK><INDEX><TYPE>

FsmCollection includes a member function, getFsmEntity, which returns the address of the entity in the collection which is responsible for processing a message. A processEvent member function possesses the following logic flow:

1. getFsmEntity
2. if FsmEntity is undefined, idle message and return
3. call FsmEntity's processEvent member function
4. return FIG. 11 is a class hierarchy diagram for FsmCollection 190. Following the above naming convention, FsmArray 210, is a class that provides behavior for a linear array of FsmEntity instances. The number of entities in the collection or set may be established during the construction phase of initialization. The FsmEntity instances in the collection are indexed by an integer. Member functions of FsmArray 210 include functions that permit manipulation of the array. For example, a public member function, createArray, may be called to create an empty array; a public member function, insertEntity, may be used to insert an FsmEntity into the array; a public member function, getEntityAtIndex, obtains the address of an FsmEntity; and getsize is a private function that returns the size of the array. The init member function of FsmArray may have the following logic flow:

1. create a new array to hold object addresses
2. do for each object in the array, call entity init method
3. if any object in array failed to initialize, then return error message
4. else return success message The required parameters for the configuration file may specify the number of entities in the array.

LockingArray 212 is a class that inherits from FsmArray 210 and adds a mutual execution lock to the parent FsmArray definition. The locking behavior is inherited from Lock class 202.

FsmDynamicArray class 214 inherits from FsmArray 210 and changes its behavior to support dynamic assignment of FsmEntity to the array. FsmDynamicArray 214 overrides the init method of FsmArray where it adds the index of every entry in the array to the idle queue. Instances of FsmDynamicArray 214 act only as the repository for the array elements. Allocation of idle array entities is performed by instances of FsmDynamicArrayAllocator 194 (FIG. 10).

FsmMap class 220 inherits from FsmCollection 190 and defines the behavior for a collection of FsmEntity that are indexed by MessageID. The MessageID obtained from the message is used to index a map or dictionary to arrive at the specific FsmEntity for processing the message. Therefore, member functions of FsmMap 220 include createDictionary, which creates a dictionary for MessageID to FsmEntity mapping, and insertEntity, which inserts an FsmEntity into the created dictionary. A getFsmInstanceID member function may have the following logic flow:

1. get MessageID from received Message
2. get address of target FsmEntity from dictionary using MessageID
3. if target FsmEntity is not found, then print trace message and return
4. else return address of FsmEntity LockingMap class 222 inherits from FsmMap 220 and Lock 202 to add a locking mechanism to FsmMap 220.

FIG. 12 is a context diagram illustrating the processing of Messages by dynamic arrays. When an FsmMap instance's processEvent member function is called to receive and process a first Message that requires the allocation of an FsmEntity, it is routed to an instance of FsmDynamicArrayAllocator 194. FsmDynamicArrayAllocator instance 194 obtains an idle entry in the array, and gives the message to the newly allocated entity for processing. QueueHead 222 contains the index of the next available entry in the array or idle queue. Subsequent Messages that are received by FsmMap 220 are routed to FsmDynamicArray 214.

Referring to FIG. 13, an inheritance diagram of State classes is shown. State classes define the behavior of an FsmInstance at a particular point in processing. The technique of defining states as objects removes this logic from the FsmInstance and eliminates case/if statements in the code. The state as an object is also able to encapsulate behavior that normally resides in the event functions which trigger state changes. Base State abstract class 230 defines the common behavior for all states, which are processEvent, enter, and exit. As described above, FsmInstance initiates a state change when the address of a StateID instance is returned from a processEvent member call. It calls the current state's exit member function, translates the StateID into a physical object address, and calls the next state's enter function. State class 230 provides null implementation of enter and exit functions so that derived classes are not required to use enter and exit behaviors. Member functions of State class 230 further include getStateID, which returns the StateID; setStateID, which changes the StateID; processTimeout, which provides an entry point for timeout events into the state.

LogicalStateBehavior 234 is a class that supports logical state changes for interfacing with Event objects. It contains a dictionary of defined LogicalStates which it translates into StateIDs. DictionaryState class 232 inherits from both State 230 and LogicalStateBehavior 234 and provides the interface between FsmInstance and Event objects. As described above, FsmInstance requires StateID for state changes, and Event returns LogicalState for state changes. DictionaryState 232 includes a pure virtual function, dictionaryProcessEvent that processes the event and returns a non-null LogicalState value if a state change is required. A processEvent member function has the following logic flow:

1. catch all exceptions
2. call dictionaryProcessEvent member function
3. translate and return any logical state returned by dictionaryProcessEvent
4. if exception caught, then call getErrorState
5. if object returned, rethrow exception
6. else return errorState address MooreBehavior class 236 implements the Moore state model where processing of events is performed in the state as opposed to the Meally model in which processing is performed on the event arc. MooreBehavior 236 includes enterObject member function, which may be called by a derived class to perform enter state processing; exitObject member function, which may be called by a derived class to perform exit state processing; addEntryObject member function, which sets the value of ObjectID in entryID member data; addExitObject member function, which sets the value of ObjectID in exitID member data; and initMooreBehavior member function, which may be called by derived class which resolves the enter and exit objectIDs into physical object addresses.

MooreState class 234, which inherits from MooreBehavior 236, implements the Moore state model and defines _enterEvent and _exitEvent data attributes which are translated into physical object addresses when member function initMooreBehavior is called.

EventDictionaryBehavior class 240 provides a dictionary of allowed Event objects which are indexed by MessageIDs. EventDictionaryState 240 includes an addEvent member function, which adds a State to the dictionary; getEvent member function, which provides a diagnostic interface to verify configuration of the dictionary; processMessage member function, which obtains MessageID from received Message and uses it as an associative index into the event dictionary to obtain the address of the Event object responsible for processing the message; and initEventDictionary member function, which resolves ObjectID of events in the dictionary into physical addresses. Member function procesMessage has the following exemplary logic flow:

1. get MessageID from received Message
2. if MessageID is not in event dictionary, then send processEvent message to a defaultHandler, and return the logical state returned by the defaultHandler
3. else call Event process member function and return the returned logical state The initEventDictionary member function may have the following logic flow:

1. translate defaultHandlerID into objectID
2. if error in translating address then error processing and return
3. do for each objectID in the event dictionary, translate objectID into object address, if error in translation, then error processing and return, else return success EventState class 238 inherits from both MooreState 234 and EventDictionaryBehavior 240 and acts as a dispatcher to route a message to the appropriate Event object. Using EventDictionaryBehavior class 240 as a mix-in parent, it contains a dictionary which maps the MessageID of a message to an Event object. If the MessageID is not found in the dictionary, then the Message is routed to a defaultHandler.

TimedState 242 is a class derived from EventState 238 and provides timer service to an FsmInstance. A timer is started upon entry to the state and stopped upon exit. The function of starting and stopping the timer is transparent to the user enterApplication and exitApplication methods. TimedState 242 includes an init member function, which may have the following logic flow:

1. call parent class init member function
2. if error initializing in parent class, then abort and return parent class init status
3. translate _timerInterfaceID into a physical object address
4. if error in translation, then return error to caller, else return success
5. translate timeoutEventID into a physical object address
6. if error in translation, then return error to caller, else store address of object and return success FIG. 14 is an inheritance diagram of Event classes. Event classes break out event processing into separate configured objects from the State object. Event objects can be shared by State instances. Therefore Event instances do not specify explicit State objects for state transitions. They instead return a LogicalState value which is translated by State into the corresponding destination State. Base class Event 260 is an abstract class that defines the interface for processing an event. Event 260 defines a pure virtual function processEvent, which returns a non-null LogicalState value to indicate a state change. Member function processEvent is supplied the FsmInstance address, the received Message, and the address of the current state.

DeterministicEvent 262 is a derived class from Event 260 and emulates determinsitic event handling by returning a constant LogicalState value each time it is given control. A deterministic event also forces the same state transition for a state. A member function, setLogicalState, may be called to assign a value to the LogicalState.

DeterministicFunction 264 is a derived class from Event 260 and also emulates deterministic event handling by returning a constant LogicalState value each time it is given control. DeterministicFunction 264 is similar to DeterministicEvent 262 but defines the interface for a function which does not return a logical state change indication.

Additional classes 266 with specialized applications may be defined to inherit from Event class 260.

FIG. 15 is an inheritance diagram of Message classes. Message classes define the attributes and behavior required to route a received Message to the handler for an FsmInstance, a State, or an Event to process the message. Message classes do not define any application specific behavior and support both dynamic and static messages. A dynamic message is one that is created on an as needed basis and released when it has been processed; a static message is one that exists permanently and contain no alterable information. Message classes also support arrays of FsmEntity and dictionaries or maps of FsmEntity.

Message 270 is a base abstract class for all messages exchanged within the software state machine. Message 270 defines a unique symbolic identifier, MessageID, for each type of message and an interface for idling messages. Message 270 may include a member function getMessageID, which is a pure virtual function that returns the MessageID associated with an object instance; idleYourself, which is a virtual function to request a non-static message to be deleted.

StaticMessage 272 is an internal message used for sending messages between state machine instances (FsmInstances). Instances of StaticMessage may be used when a simple efficient signaling mechanism between FsmInstances is desired.

MapBehavior 276 is an abstract class that provides an interface for obtaining the symbolic reference to a non-array FsmEntity. A pure virtual function of MapBehavior, getFsmEntityID, may be called by derived classes to return the address of a String instance which symbolically identifies the target of the message.

ArrayBehavior 278 is an abstract class that provides an interface for obtaining the index to an FsmEntity which is contained within an array of FsmEntity. A pure virtual function of ArrayBehavior 278, getFsmArray, may be called to get the array index of an FsmEntity.

ApplicationBehavior 280 is an abstract class which provides an interface for obtaining the symbolic name of the application which is the target of the message. A pure virtual function, getFsmApplicationID, may be used to obtain the address of a String instance which symbolically identifies the target of the message.

MultiDimensionMessage 274 is a class that is derived from StaticMessage 272 and mixes in the interfaces defined by MapBehavior 276, ArrayBehavior 278, and ApplicationBehavior 280. IT is required by FsmArray and FsmMap instances to determine the FsmEntity within their collection that is the target of the message.

Other application specific message classes 282 inheriting from MultiDimensionMessage 274 may be defined in the future.

FIG. 16 is a context diagram of the foundry classes. The foundry classes are used to construct and transmit messages which are exchanged with other processes or objects within this process. Foundry objects are manufactured from foundry factory objects and therefore require a configuration file to be created. A user application 300 may request Foundry 302 to manufacture a particular FsmEntity object. Foundry responds by requesting an instance of OutgoingMessageFoundry 306 to create the message. Instances of OutgoingMessageFoundry 306 are manufactured by OutgoingMessageFoundryFactory objects 304 in response to requests from Foundry 302. Foundry class 302 is an outgoing message manufacture center. It is a container class of objects of type OutgoingMessageFoundry 306. A member function, manufacture, is used to address the foundry object which is responsible for manufacturing a message and outputting the message. Member function manufacture looks up the OutgoingMessageFoundry object which is responsible for manufacturing an instance of MessageID received from user application 300. An exemplary logic flow for manufacture follows:

1. if a foundry object is not in the dictionary for the MessageID, display an error message and return error
2. else call the create member function of the object located in the dictionary and return the create status Another member function, addFoundry, is called to add an OutgoingMessageFoundry object to the dictionary if an entry for the MessageID is not already present. An exemplary logic flow for addFoundry follows:

1. if dictionary already contains an entry for the passed MessageID, then error
2. else add passed object to the dictionary and return success FIG. 17 is an inheritance diagram of OutgoingMessageFoundry 306. OutgoingMessageFoundry 306 is a base class for object stored in Foundry 302. Objects of the type OutgoingMessageFoundry 306 are used to create instances of message objects which are transmitted out of the current FsmEntity instance. A member function create provides the public interface to manufacture an outgoing message instance. Create may have the following exemplary logic flow:

1. create empty message object
2. if unable to create message then return failure
3. construct derived message
4. if message is not built then return failure
5. else send message and return success OutgoingMessageFoundry 306 further includes a pure virtual function, send, to send the created message to its destination point.

PortMessageFoundry 308 is a derived class from OutgoingMessageFoundry 306 and supports the creation of messages which are transmitted out of a PortMap instance 310. When the create method of PortMessageFoundry 308 is called, it manufactures an instance of an OSMessage, which is transmitted through PortMap instance 310. This may be seen in the context diagram in FIG. 18. PortMessageFoundry 308 may include an init member function, which may have the following logic flow:

1. call parent init method
2. if parent init call failed then return failure
3. if Port objectID not specified then error and return failure
4. get address of Port object from ObjectDictionary
5. if unable to find object in ObjectDictionary then error return
6. else return success FIG. 19 is a context diagram of command classes and FIG. 20 is an inheritance diagram thereof. Command classes provide a framework for a user interface into the process. Command objects encapsulate the behavior required for an individual command. All command objects are descended from abstract class Command 324. Command objects are singletons that are created and placed in a CommandDictionary 322 before main is called. CommandThread 320 receives a String object which contains the contents of a command. CommandThread 320 calls an execute member function of CommandDictionary 322, which is the public interface that parses the command, tokenizes the command string (RWCTokenizer), and looks up in the dictionary whether the command is contained therein. If it is in the dictionary, then it executes the command object execute member function. A member function of Command 324, execute, defines the interface for executing the command encapsulated in the object instance.

A TraceControlCommand class 326 is a derived class of Command 324. An execute member function of TraceControlCommand 326 may have the exemplary logic flow:

1. get new trace state option from command
2. if trace state not specified then error return
3. convert trace state to upper case
4. if new trace state is ENABLE then enable tracing for global trace object
5. else if new state is DISABLE then disable tracing for global trace object
6. else error return Another member function of TraceControlCommand 326 is stringStream, which defines the interface for dumping the contents of the command into a string object. Since it may be defined as a virtual function, derived classes are expected to override the parent implementation but call the parent implementation as part of their implementation.

A derived class of Command 324 is TraceObjectCommand class 328. TraceObjectCommand 326 encapsulates the TraceObject user command for controlling the tracing of objects within the ObjectDictionary. If the objectID obtained from the command is ALL, then the trace state of all objects in the ObjectDictionary is affected as ENABLE or DISABLE, as specified in the command.

DumpObjectCommand 330 is a derived class of Command 324 and is responsible for executing a DumpObject user command.

Figure 21:
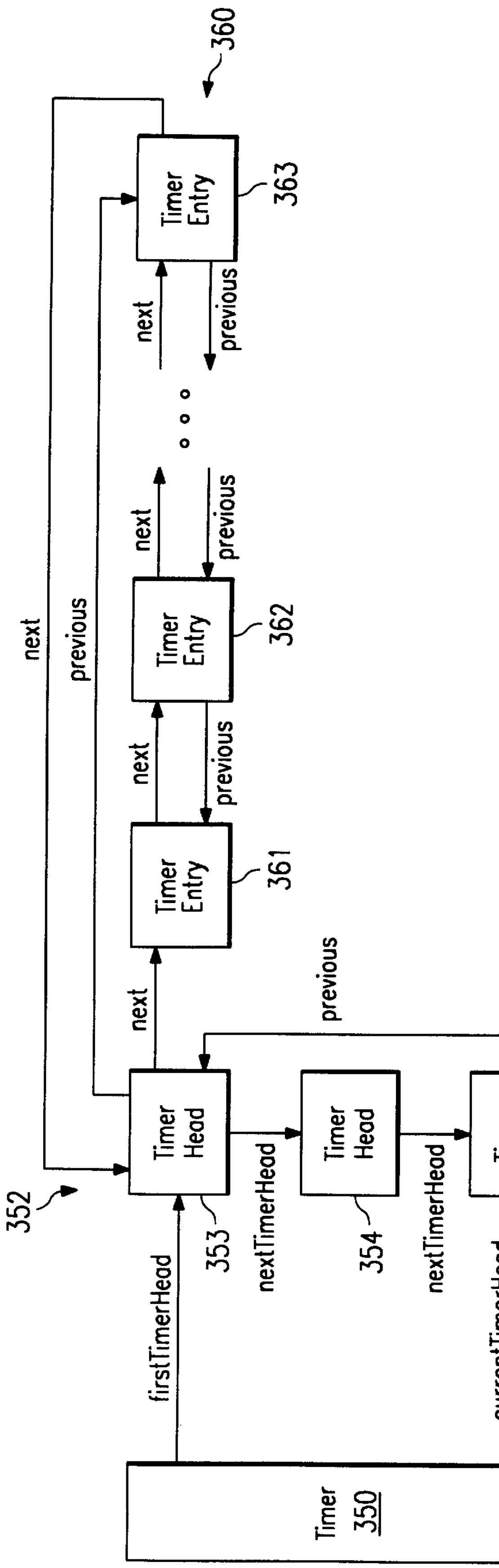
FIG. 21 is a Timer class context diagram according to an embodiment of the present invention.
Figure 21:
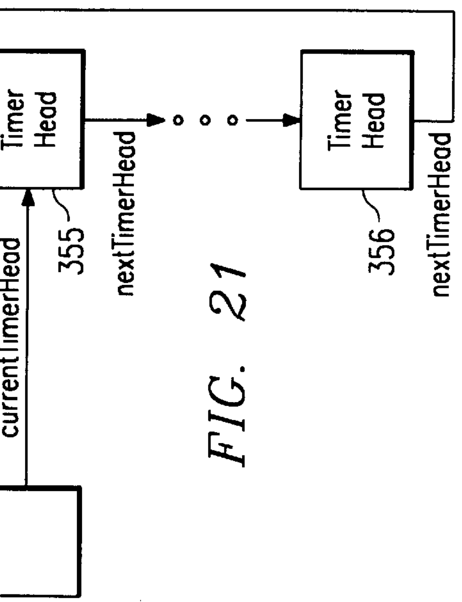

FIG. 21 is a context diagram for Timer classes and FIG. 22 is an inheritance diagram for timer queue classes. Timer class 350 is a class that may be used to control the creation and expiration of timers. It maintains a set of counters that are individually added or removed by external threads. Timer 350 supports timing activities that are not restricted to state or event timeouts. Timer 350 is designed to minimize the time required to insert and remove entries and also manage the decrement of timers, and detect and process timeouts. Efficiency is gained by using multiple timing queues to reduce the average length of each queue. An init member function of Timer 350 creates an array 352 of $2^n$ TimerHead instances 353–356. TimerHeads 353–356 are linked together by attribute _nextTImerHead to form a circular list. The array 352 of TimerHeads 353–356 are used to implement a hashing algorithm that uses the least significant bit "n" of the desired time count as an index into the array 352. TimerEntry 361–363 form an array or queue 360 of timers maintained by Timer 350. TimerEntry class provides the interface to isolate the actions to perform when the timer entry count expires.

Timer 350 includes a tick member function called by a TimerThread instance for each progression of the timer tick. Tick member function locks Timer 350 and examines the TimerHead currently addressed by Timer 350, and if the current TimerHead has one or more TimerEntry 360 in its queue, tick decrements the counter of all TimerEntries in the queue that has a count greater than zero. TimerEntries with a count of zero before decrementing are removed for timeout processing. The processTimeout member function of TimerScheduler 378 is called after the timed out TimerEntry is removed from the TimerHead queue. Then tick member function advances to the next TimerHead in the circular list. After $2^n$ calls to tick, all TimerEntry queues pointed to by all TimerHeads are cycled through, decremented and timeouts processed.

Timer 350 has an init member function which may have the following logic flow:

1. call parent state init
2. if parent init failed then return parent init status
3. create array of TimerHead
4. if failed to create TimerHead array, then return failure
5. link TimerHeads together into a circular list
6. initialize currentQueueHead attribute to start of circular chain
7. return success An addTimer member function of Timer 350 has the following exemplary logic flow:

1. computer counter LSB (least significant bit) and MSB (most significant bit) values
2. lock Timer
3. get current TimerHead number
4. add counter LSB to current TimerHead number (MOD number of TimerHeads) to produce a TimerHead where TimerEntry will be added
5. store MSB value in TimerEntry
6. add TimerEntry to end of TimerHead queue
7. unlock Timer Referring again to FIG. 22, QueueEntry class 370 is the base class definition for all objects which can be stored in a doubly linked queue. QueueEntry class 370 includes many queue manipulation or access methods such as getNext, getPrevious, addNext, addPrevious, removeEntry, idleYourself, etc. CounterQueue 372 is a class derived from QueueEntry 370 and is the base class for queue entries which are manipulated by Timer 350. The classes shown in FIG. 22 are created dynamically by classes such as Timer 350 and are typically not directly manufactured from a configuration file. CounterQueue 372 instances contain a counter attribute which determines the remaining time before the entry expires or times out. CounterQueue defines a _count attribute as an integer value, and member functions for manipulating or accessing the _count value. These member functions include setCount, getCount, decCount, subtractCount, and increaseCount member functions. Member function subtractCount is able to reduce the count by a passed value, whereas decCount decrements the count by one.

As described above, TimerEntry 374 is an abstract class for timers maintained by Timer 350. TimerEntry 374 derives some of its behavior from CounterQueue 372. TimerHead 376 is a derived class from CounterQueue 372 and Lock 202.

TimerScheduler 378 inherits from TimerEntry 374 and is responsible for adding a ScheduledFsmEvent instance to the end of a TimerEntry queue when member function processTimeout is called. Instances of TimerScheduler are assumed to be permanently assigned to a specific FSM and therefore are not dynamically created and destroyed.

FIG. 23 is an inheritance diagram of queue objects. As described above, class QueueEntry 370 defines the attributes and behavior required to maintain linked lists of objects. Timer queue classes shown in FIG. 22 derived their queue behaviors from QueueEntry 370. LockedQueueEntry 372 is a class that adds a mutual exclusion lock to QueueEntry, its parent class definition.

ScheduledActivity 373 is the base class for all classes which implements scheduled processing. Scheduling is required to manage multiple instances of FSMS. Otherwise, one thread of execution is required for each FSM. Scheduling processing is also desirable to break up the context of execution. Specific sequences of events may overrun the stack if the context of execution is not broken up into separate activities. Scheduling the processing of a ScheduledActivity is an abstract base class and defines member function executeActivity, which is the common interface for performing the required processing.

ScheduledMessage 375 is a class derived from ScheduleActivity 373 and may be used to handle a message that has been scheduled for processing.

ScheduledFsmEvent 377 is a class derived from ScheduledActivity 373. An instance of ScheduledFsmEvent is created when a message is to be processed for a specific FsmInstance. A ScheduledFsmEvent instance 377 is created when one FsmInstance has a message or event for another FsmInstance and a context break is required. Instances of ScheduledFsmEvent are typically used for internal communication in hierarchical state machines. Context breaks are required for communication between FsmInstances which can send messages in both directions. Only FsmInstance can be allowed to directly call the processMessage member function of the connected FsmInstance. The second FsmInstance must also schedule its messages. Otherwise, execution loops can be entered that overflow the stack. ScheduledFsmEvent 377 has an attribute _fsm that holds the address of the FsmInstance assigned to process the message; _message that holds the address of the Message instance to be processed. Its executeActivity member function calls _fsm object's processEvent member function to process the message.

QueueHead 380 derives its behavior from QueueEntry 370 and Object 170 and instances thereof may be used to store and retrieve items in a FIFO (first in first out) or LIFO (last in first out) order. Its attribute _next contains the address of the first entry in the queue, while _previous contains the address of the last entry in the queue. A queue is empty if the contents of _next and _previous are equal to the address of the queue head. QueueHead 380 further supplies other queue manipulation and access member functions. LockedQueue 382 is a derivative of QueueHead 380 and Locked 202 and adds a mutual exclusive lock to QueueHead's class definition.

WaitQueue 384 is an abstract class that defines the interface for waiting on an empty queue. WaitQueue 384 may be used in multi-processing environments where operating system calls are required for context shifts or foreground/background applications where the program can loop if the queue is empty. WaitQueue 384 defines a wait pure virtual function which may be called by removeLast and removeFirst if the queue is empty. Wait suspends process or task in a multi-processing environment or simply returns in foreground or background processing applications. Another pure virtual function, signal, is called by addFirst and addLast when an entry is added to an idle queue. Signal readies the first suspended task waiting for an entry on the queue.

SemaphoreQueue 386 inherits from WaitQueue 384 and contains a Semaphore object used to suspend a thread while it is waiting for an entry to be added to the queue. SemaphoreQueue implements pure virtual functions wait and signal defined by WaitQueue 384.

Figure 24:
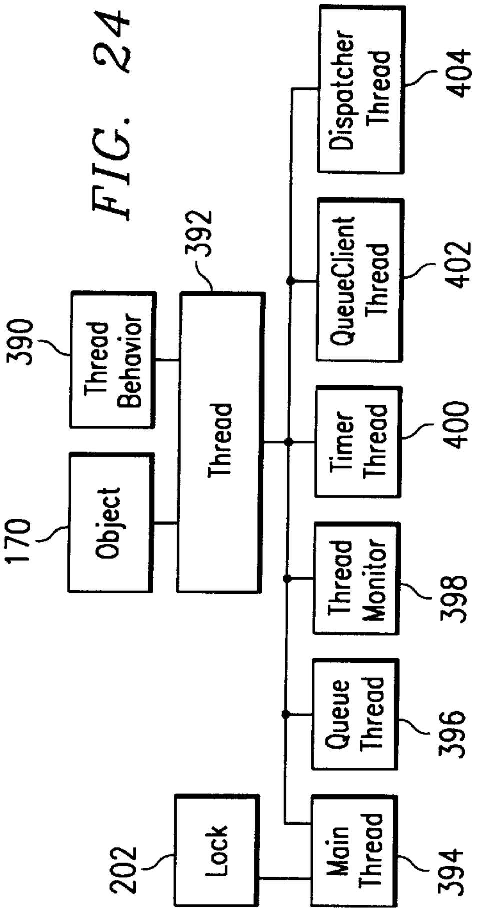
FIG. 24 is a Thread class inheritance diagram according to an embodiment of the present invention.

FIG. 24 is an inheritance diagram for Thread classes. The application platform may not impose any preconceived thread architecture on the user application. Therefore, no threads are created unless they are specified in the user configuration files. Each thread is a manufactured object. Thread class 392 is the abstract base class for all thread type objects. Thread class 392 mixes the behavior of both Object 170 and ThreadBehavior 390. ThreadBehavior 390 contains all of the interfaces required for starting and stopping a thread. Since ThreadBehavior is a mix-in, its behavior can be re-used in applications which do not desire the generalized behavior provided by the application platform. Thread 392 includes startExecution member function to create a thread of control for an instance of an object descended from Thread. When a thread of control is created, it adds its associated Thread object to a global ThreadDictionary. All threads are accessible from the ThreadDictionary by their ThreadID. Post thread termination control is supported in class ThreadMonitor 398. If an instance of ThreadMonitor 398 is created, the thread suspends on a thr_join call. If any thread exits via a thr_exit call, it is activated with the ThreadID of the terminating thread. If a Thread object is stored in the ThreadDictionary with the ThreadID, its threadExit member function is called. Classes of Thread objects are described in more detail below.

Figure 25:
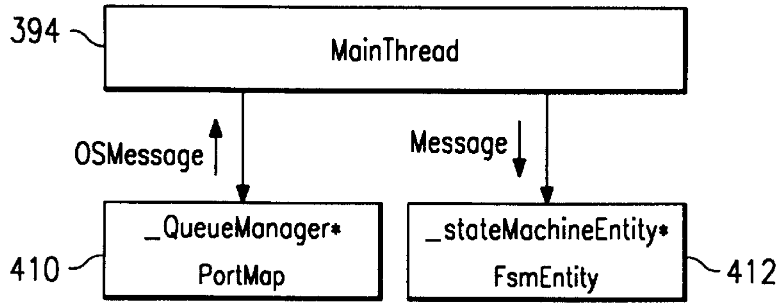
FIG. 25 is a Thread class context diagram according to an embodiment of the present invention.

MainThread 394 inherits from Thread 392 and Lock 202 and provides a general interface for obtaining OSMessages from a QueueManager 410, and converting them to Messages and giving them to a stateMachineEntity for processing, as shown in FIG. 25. MainThread 394 defines a pure virtual function from which derived classes must implement to convert OSMessage instances to a type of Message. MainThread 394 includes a threadStart member function, which may have the following logic flow:

1. do forever
2. get an OSMessage from the QueueManager
3. if error in getting OSMessage, then send trace message to the cpTraceAndEvent object
4. convert OSMessage to a Message (makeMessage)
5. send processMessage to stateMachineManager
6. end do Member function getMessage, is used in step 2 above to receive an OSMessage from the PortMap default queue. Member function makeMessage is a pure virtual function which implements an interface to return a type of Message when passed an OSMessage instance.

Figure 26:
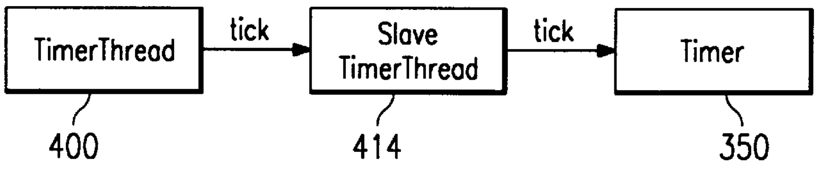
FIG. 26 is a TimerThread class context diagram according to an embodiment of the present invention.
Figure 27:
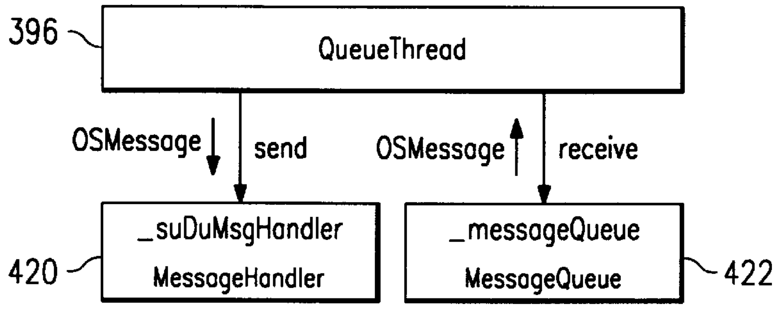
FIG. 27 is a QueueThread class context diagram according to an embodiment of the present invention.

TimerThread 400 is another class that is derived from Thread 392. TimerThread 400 is one of two threads of control that are required for execution of the Timer object within a UNIX programming environment. Two threads are used to insure that a constant average rate at which the Timer tick member function executes. TimerThread is responsible for signaling SlaveTimerThread 414 at a constant tick interval, as seen in FIG. 26. TimerThread 400 contains a simple execution loop which delays in a poll system call for the interval required between Timer ticks. After waking from its suspended state, TimerThread calls SlaveTimerThread's tick member function before suspending again. SlaveTimerThread 414 is the context under which Timer timer updates are performed. SlaveTimerThread contains a semaphore object which is incremented by TimerThread 400 when it calls SlaveTimerThread's tick member function. SlaveTimerThread 414 suspends on the semaphore between calls to the tick member function of Timer 350. The interval between suspension of SlaveTimerThread cannot be controlled due to the random nature of the work that it must perform internal to Timer 350. However, the state of the semaphore insures that no timer ticks are lost.

QueueThread 396 is a class derived from Thread 392 and is responsible for receiving OSMessages from a queue based thread or process 422 and transmits them to the message handler 420 of a non-resident application via a socket. This may be seen in FIG. 27.

Figure 28:
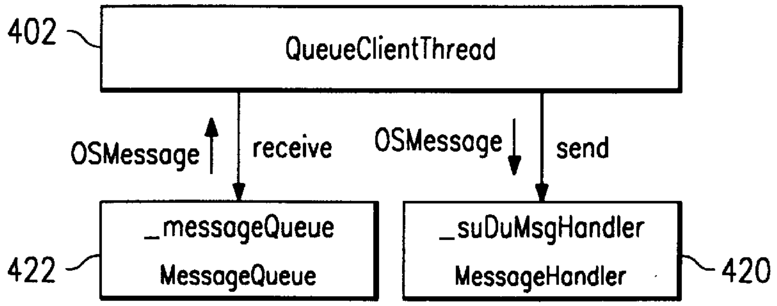
FIG. 28 is a QueueClientThread class context diagram according to an embodiment of the present invention.

QueueClientThread 402 is a class derived from Thread 392 and is responsible for receiving OSMessages from the message handler 420 of a non-resident application and transmits them to an application task or process via a socket, as shown in FIG. 28.

DipatcherThread 404 is another class derived from Thread 394. DispatcherThread 404 supports the execution of work scheduled internal to the process. Two FsmEntity instances may schedule the processing of messages for each other by creating an instance of ScheduledActivity 374 and adding it to the QueueHead 380 monitored by the DispatcherThread instances. This is shown in FIG. 29. One or more instances of DispatcherThread 404 may get instances of ScheduledActivity 374 from a QueueHead 380. An executeActivity member function of each ScheduledActivity instance is called before requesting the object to idle itself. DispatcherThread 404 is needed to break up the context of execution for timeout processing and situations involving the processing of internal messages sent between objects in the application. Without the use of DispatcherThread, deadlock conditions may occur.

FIG. 30 is an inheritance diagram of trace object classes. Two platform independent trace classes are provided. Tracer 430 provides for system wide enabling or disabling of tracing. When a Tracer object is in the disabled state, no trace statements are executed. The trace state can be changed via enableTracing and disableTracing member function calls. ThrottledTracer 432 derives from Tracer 430 and supports dynamic throttling or stopping of trace messages in overload situations. It defines member functions for enabling, disabling, starting and stopping throttling. FIGS. 31A and 31B illustrates the execution flow during enable and disable trace states. FIGS. 32A through 32C illustrate the execution flow during throttling disabled, throttling inactive, and throttling activated states.

Figure 33:
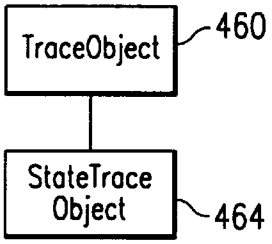
FIG. 33 is a TraceObject class inheritance diagram according to an embodiment of the present invention.

FIG. 33 is an inheritance diagram of trace object classes. The set of trace objects encapsulates the data which is to be printed out in a trace operation. TraceObject 460 is the base class and defines the interface for streaming the trace data out to an operating system trace stream. StateTraceObject 464 is a class derived from TraceObject 460 and encapsulates trace messages to be printed to indicate state changes.

Figure 34:
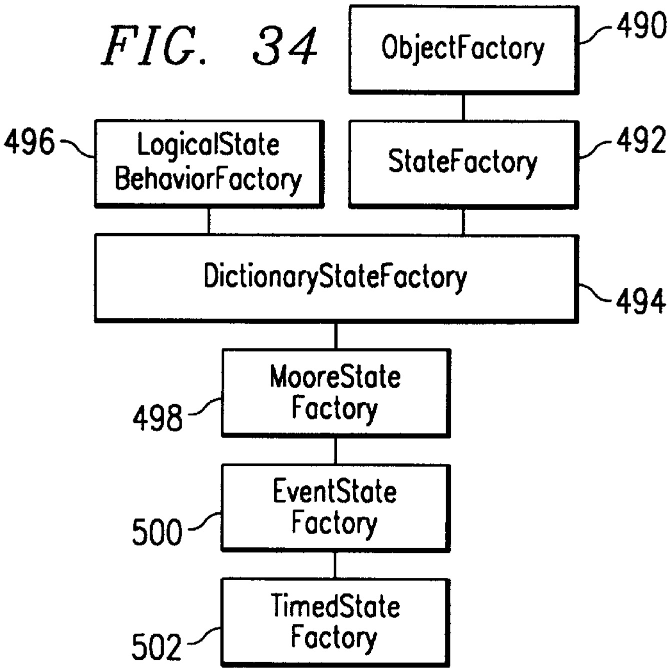
FIG. 34 is a StateFactory class inheritance diagram according to an embodiment of the present invention.

FIG. 34 is an inheritance diagram of state factory classes. Factory objects are responsible for the creation of an instance of a specific class. Every instance of a class which may be created from a configuration file is created by a factory object. Factory objects are referenced through the global Factory object. One static instance of each type of factory object is created and added to Factory before main is entered. All factory objects are derived from abstract class ObjectFactory 490. ObjectFactory 490 defines the interface for creating an object of a specific class. Its member function, create, is called by Factory to manufacture an instance. Member function create is passed the name of the configuration file which defines the values of all the attributes required by the object. Member function create calls pure virtual function createObject to create an empty instance of the object, and then calls virtual function constructDerivedObject to configure the object attributes as specified in the configuration file.

StateFactory 492 is a derived class from ObjectFactory 490. StateFactory 492 is an abstract factory class for creating State instances. StateFactory configures the state instance with the StateID obtained from the configuration file. A member function constructDerivedObject may have the following logic flow:

1. call parent class constructDerivedObject
2. if parent class construct failed return null object address
3. get StateID from configuration file
4. if unable to get StateID, stream an error message, delete the object and return null object address
5. store StateID in the new state instance
6. return address of new state instance DictionaryStateFactory 494 is an abstract factory class for creating DictionaryState instances and inherits from both StateFactory 492 and a LogicalStateBehaviorFactory 496. DictionaryState contains LogicalStates to StateID mappings. A member function constructDerivedObject of DictionaryStateFactory may have the following logic flow:

1. call parent class constructDerivedObject
2. if parent construct failed, then return null object address
3. get number of elements in dictionary from the configuration file
4. if error getting number of elements, then deleting object and return
5. do for the number of elements in configuration file:
6. get LogicalState from the configuration file
7. if error getting LogicalState, stream out an error message, delete object and return
8. get StateID from the configuration file
9. if error getting StateID, then stream out error message, delete object and return
10. add LogicalState and StateID pair to objectDictionary
11. if error adding, then delete object and return null
12. end do
13. return object instance MooreStateFactory 498 is a derived class from DictionaryStateFactory 494 and creates instances of MooreState from a configuration file. Its constructDerivedObject member function calls the parent constructDerivedObject method to create the object and obtains an ObjectID from the configuration file to store it in the created object.

EventStateFactory 500 inherits from MooreStateFactory 498 and creates instances of EventState from a configuration file. Its constructDerivedObject member function may have the following logic flow:

1. call parent class constructDerivedObject
2. if parent construct failed, then return null object address
3. do for each event object in configuration file:
4. get MessageID from the configuration file
5. if error getting MessageID, stream out an error message, delete object and return
6. get ObjectID from the configuration file
7. if error getting ObjectID, then stream out error message, delete object and return
8. add LogicalState and StateID pair to event objectDictionary
9. if error adding, then stream out error message, delete object and return null object address
12. end do
13. return object address TimedStateFactory 502 is a class derived from EventStateFactory 500. TimedStateFactory creates instances of TimedState from a configuration file.

Figure 35:
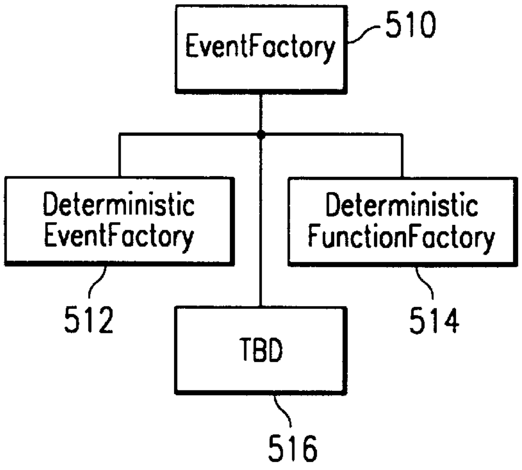
FIG. 35 is an Event class inheritance diagram according to an embodiment of the present invention.

FIG. 35 is an inheritance diagram of EventFactory objects. EventFactory 510 is an abstract class for creating Event instances. EventFactory 510 defines the interface for creating an instance of a class in the Event classes. DeterministicEventFactory 512 is a factory class for creating instances of DeterministicEvents. DeterministicFunctionFactory 514 is a factory class for creating instances of DeterministicFunctions. Both DeterministicEventFactory 512 and DeterministicFunctionFactory 512 have constructDerivedObject member functions that calls the parent constructDerivedObject for creating the object, obtains the LogicalState from a configuration file, and stores the LogicalState in the created object. Other classes 516 may be defined in the future.

Figure 36:
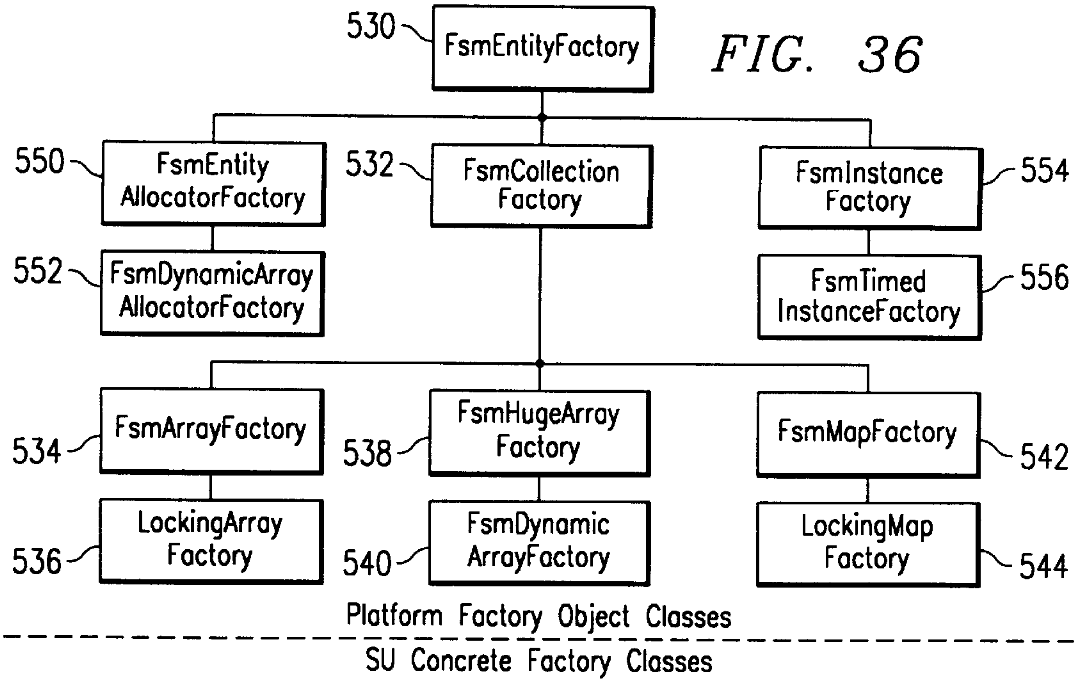
FIG. 36 is an FsmEntityFactory class inheritance diagram according to an embodiment of the present invention.

FIG. 36 is an inheritance diagram of FsmEntity factory classes. FsmEntityFactory 530 is an abstract factory class for creating FsmEntity instances. FsmEntityFactory 530 defines the interface for creating an instance of a class in the FsmEntity family. FsmCollectionFactory 532 inherits from FsmEntityFactory 530 and is responsible for creating instances of FsmCollection objects. FsmArrayFactory 534 inherits from FsmCollectionFactory 532 and is responsible for creating instances of FsmArray objects. Its constructDerivedObject member function may have the following logic flow:

1. call parent class constructDerivedObject
2. if parent construct failed, then return null object address
3. get number of elements in array
4. if error then stream error message, delete object, and return null object address
5. create empty array
6. if error in creating array, then stream error message, delete object and return null object address 7. do for each element in array:
8. get configuration file name for element from configuration file
9. if error in getting configuration file name, then stream out error message, delete object and return null object address
10. request Factory to build an instance of object specified in the configuration file
11. if error in building, then return null object address
12. store address of element object in array
13. end do
14. return array object address FsmHugeArrayFactory 538 is also a class derived from FsmCollectionFactory 532. FsmHugeArrayFactory provides the interface definition for all FsmHugeArray objects which are derived either directly or indirectly from FsmHugeArrayFactory. FsmHugeArrayFactory defines the interfaces required to build the attributes defined by FsmHugeArray from a configuration file. Its constructDerivedObject member function may have the logic flow:

1. call parent class constructDerivedObject
2. construct attributes defined in base class first
3. if null object address returned, then return null object address
4. if error in base class construction, return
5. get number of entities in array
6. get configuration file name used to create one FsmInstance
7. if error in getting configuration file name, then stream error message, delete partially created object, and return
8. create empty array
9. if error in creating array within object, then stream error message, delete partially constructed object and return
10. do for each entity in array:
11. manufacture one instance of entity
12. if failed to manufacture, delete partially created array object and return
13. add object to the array
14. if error in adding entity to the array, then delete partially created array and return
15. end do
16. return array address FsmMapFactory 542 inherits from FsmCollectionFactory 532 and is a class that creates instances of FsmMap and returns the address of the object. LockingArrayFactory 536 inherits from FsmArrayFactory 534 and creates instances of LockingArray. FsmDynamicArrayFactory 540 inherits from FsmHugeArrayFactory 538 and creates instances of FsmDynamicArray. LockingMapFactory 542 inherits from FsmMapFactory 542 and creates instances of LockingMap.

FsmEntityAllocatorFactory 550 inherits from FsmEntityFactory 530 and creates instances of FsmEntityAllocator from a configuration file. Its constructDerivedObject member function may have the following logic flow:

1. call parent class constructDerivedObject
2. construct attributes defined in base class first
3. if null object address returned, then return null object address
4. if error in base class construction, return
5. get the idle queue ObjectID from the configuration file
6. if error in getting ObjectID, then stream error message, delete object, and return
7. store objectID in the object FsmDynamicArrayAllocatorFactory 552 inherits from FsmEntityAllocatorFactory 550 and creates instances of FsmDynamicArrayAllocator form a configuration file. FsmInstanceFactory 554 inherits from FsmEntityFactory 530 and creates instances of FsmInstance by obtaining StateIDs from the configuration file. FsmTimedInstanceFactory 556 inherits from FsmInstanceFactory 554 and creates instances of FsmTimedInstance.

Figure 37:
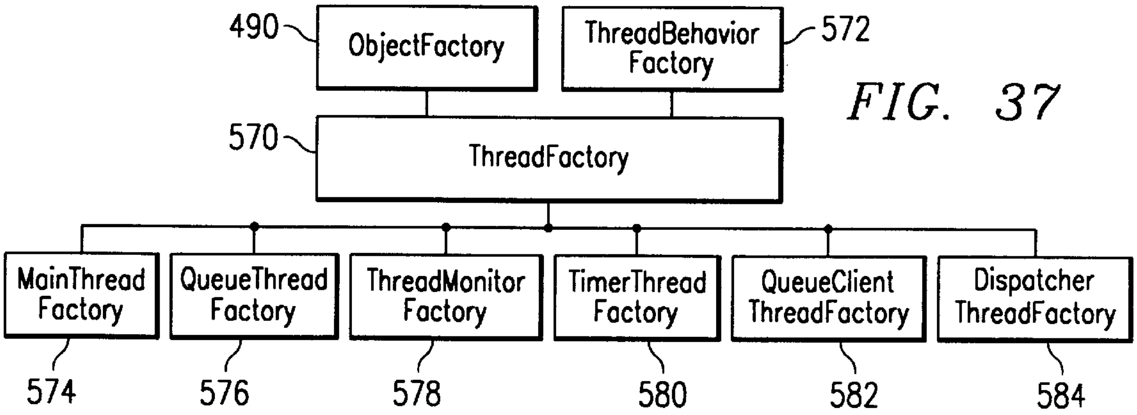
FIG. 37 is a ThreadFactory class inheritance diagram according to an embodiment of the present invention.

FIG. 37 is an inheritance diagram of Thread factory classes. ThreadFactory 570 inherits from both ObjectFactory 490 and ThreadBehaviorFactory 572 and creates instances of Thread from a configuration file. ThreadBehaviorFactory 572 includes a constructDerivedObject member function that may have the following logic flow:

1. get thread name
2. if unable to access element, then print error message, delete object, return
3. store thread name in object
4. get attribute STACK_SIZE from configuration file
5. if STACK_SIZE is specified, convert STACK_SIZE to integer value
6. if error in conversion, print error message
7. get attribute THREAD_PRIORITY from configuration file
8. if THREAD_PRIORITY is specified, convert THREAD_PRIORITY to integer
9. if error in conversion, print error message
10. get attribute BOUND_STATE from configuration file
11. if THREAD_PRIORITY is specified, if value is TRUE or FALSE, then store new value in object, else print error message and return
12. get attribute REAL_TIME_STATE from configuration file
13. if REAL_TIME_STATE is specified, convert to integer
14. if error in conversion, print error message
15. get attribute TIME_SHARE_STATE from configuration file
16. if TIME_SHARE_STATE is specified, convert to integer
17. if error in conversion, print error message MainThreadFactory 574 inherits from ThreadFactory 570 and creates instances of MainThread from a configuration file. Its constructDerivedObject member function may have the following logic flow:

1. call parent class constructDerivedObject
2. construct attributes defined in base class
3. if null object address returned, then return null object address
4. get the QueueManager ID from the configuration file
6. if error in getting QueueManager ID, then delete object and return
7. store objectID in the object
8. get FsmEntity ID from configuration file
9. if error getting FsmEntity ID, delete object and return
10. store ObjectID in the object QueueThreadFactory 576 inherits from ThreadFactory 570 and creates instances of QueueThread from a configuration file. Its constructDerivedObject member function may have the following logic flow:

1. call parent class constructDerivedObject
2. construct attributes defined in base class
3. if null object address returned, then return null object address
4. get the MessageHandler ID from the configuration file
6. if error in getting MessageHandler ID, then delete object and return
7. store objectID in the object ThreadMonitorFactory 578 also inherits from ThreadFatory 570 and creates instances of ThreadMonitor from a configuration file. TimerThreadFactory 580 inherits from ThreadFatory 570 and creates instances of TimerThread from a configuration file. Its constructDerivedObject member function may have the following logic flow:

1. call parent class constructDerivedObject
2. construct attributes defined in base class
3. if null object address returned, then return null object address
4. get the Timer ID from the configuration file
6. if error in getting Timer ID, then delete object and return
7. store objectID in the object
8. get the timer activation interval from the configuration file
9. if error, then delete the object and return QueueClientThreadFactory 582 inherits from ThreadFactory 570 and creates instances of QueueClientThread from a configuration file. Its constructDerivedObject also uses the parent constructDerivedObject member function to create the object, gets the MessageHandler ID from the configuration file and stores the ObjectID in the object. DispatcherThreadFactory 584 inherits from ThreadFactory 570 and creates instances of DispatcherThread from a configuration file. Its constructDerivedObject gets the activity queue ID from the configuration file and stores the ObjectID in the object.

Figure 38:
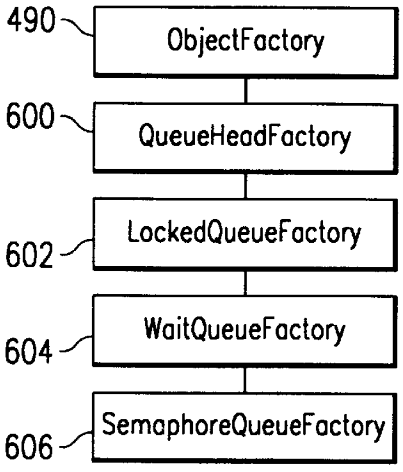
FIG. 38 is a QueueHeadFactory class inheritance diagram according to an embodiment of the present invention.

FIG. 38 is an inheritance diagram of QueueHead factory objects. QueueHeadFactory 600 inherits from ObjectFactory 490 and creates instances of QueueHead from a configuration file. LockedQueueFactory 602 inherits from QueueHeadFactory 600 and creates instances of LockedQueue from a configuration file. WaitQueueFactory 604 inherits from LockedQueueFactory 602 creates instances of WaitQueue from a configuration file. SemaphoreQueueFactory 606 inherits from WaitQueueFactory 604 and creates instances of SemaphoreQueue from a configuration file. All QueueHead factory objects have constructDerivedObject member functions that call parent constructDerivedObject methods, constructs attributes defined in the base class, and returns a null object address if a null object address is returned by the construction step.

Figure 39:
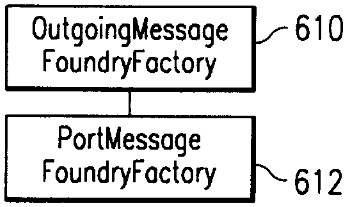
FIG. 39 is an OutgoingMessageFoundryFactory class inheritance diagram according to an embodiment of the present invention.

FIG. 39 is an inheritance diagram of OutgoingMessageFoundry factory classes. OutgoingMessageFoundryFactory 610 is a base class that creates instances of OutgoingMessageFoundry from a configuration file. Its constructDerivedObject member function may have the logic flow:

1. call parent class constructDerivedObject
2. construct attributes defined in base class
3. if null object address returned, then return null object address
4. get the MessageID from the configuration file
6. if error in getting MessageID, then display error message, delete object and return
7. store objectID in the object
8. return address of object as it has been constructed so far PortMessageFoundryFactory 612 inherits from OutgoingMessageFoundryFactory 610 and creates instances of PortMessageFoundry from a configuration file. Its constructDerivedObject member function logic flow may be:

1. call parent class constructDerivedObject
2. construct attributes defined in base class
3. if null object address returned, then return null object address
4. get the port directory ID from the configuration file
6. if error in getting port directory ID, then delete object and return
7. store objectID in the object
8. get queue name from configuration file
9. if error getting queue name, delete object and return
10. store queue name in the object Although the present invention and its advantages have been described in detail, it should be understood that various mutations, changes, substitutions and alterations can be made therein without departing from the spirit and scope of the invention as defined by the appended claims.

What is claimed is:

1. A generic software state machine for implementing a software application in an object oriented environment, comprising:

a set of state objects defined for each software element of the software application that the software element may enter, the set of state objects representing a number of behavior states that a particular one of the software elements may express, the particular one of the software elements being associated with a particular one of the state objects; and a set of event objects defined for each state object representative of inputs that the software element may receive or actions the software element may encounter while being associated with the particular one of the state objects, the software element operable to change its association to another one of the state objects in response to the inputs received or actions encountered.

2. The generic software state machine, as set forth in claim 1, further comprising a set of entity objects defined for the software elements, the entity objects being associated with the set of state objects.

3. The generic software state machine, as set forth in claim 1, wherein each state object includes a state ID attribute.

4. The generic software state machine, as set forth in claim 1, wherein each state object comprises:

an entry member function for the state object for performing functions associated with the entry of the state represented by the state object by the entity object; and an exit member function for the state object for preforming functions associated with the exit of the state represented by the state object by the entity object.

5. The generic software state machine, as set forth in claim 1, wherein the set of entity objects are grouped into a collection.

6. The generic software state machine, as set forth in claim 1, wherein the set of entity objects are grouped into an array.

7. The generic software state machine, as set forth in claim 1, further comprising a thread object adapted for receiving an input and creating a message object encapsulating the input, the message object having a message ID.

8. The generic software state machine, as set forth in claim 1, further comprising a timer class adapted to provide a set of timers, the timer class including:

an init member function adapted to create an array of timer queue head objects linked in a circular list, the timer queue head objects each begin a queue of timer entry objects;

an add timer member function adapted to add a timer entry object to a queue;

a remove timer member function adapted to delete a timer entry object from a queue; and a tick member function adapted to advance the state of timer entry objects in one queue one clock tick.

9. The generic software state machine, as set forth in claim 1, further comprising a queue entry class adapted to provide and maintain a queue of objects, the queue entry class including:

a get next member function adapted to return contents of an object after a current object in the queue;

a get previous member function adapted to return contents of an object before a current object in the queue;

a set next member function adapted to update contents of an object after a current object in the queue with a passed value;

a set previous member function adapted to update contents of an object before a current object in the queue with a passed value; and a remove entry member function adapted to remove an object in the queue.

10. The generic software state machine, as set forth in claim 2, wherein each entity object, state object, and event object includes an object ID attribute.

11. The generic software state machine, as set forth in claim 2, further comprising an event dictionary containing a mapping of message IDs to the addresses of the event objects.

12. The generic software state machine, as set forth in claim 7, further comprising a FSM map object adapted for receiving the message object from the thread object, and translating the message ID into an address of an entity object assigned for processing the message object.

13. The generic software state machine, as set forth in claim 7, wherein the entity object includes a process event member function adapted for processing the message.

14. The generic software state machine, as set forth in claim 8, wherein the timer entry object includes a process time out pure virtual member function adapted to perform actions when timer entry count expires.

15. The generic software state machine, as set forth in claim 10, further comprising an object dictionary containing a mapping of object IDs to the entity objects, state objects, and event objects.

16. The generic software state machine, as set forth in claim 12, wherein the entity object assigned for processing the message object is one of a collection of entity objects, the entity object being identifiable by an FSM instance ID contained in the message object.

17. The generic software state machine, as set forth in claim 15, further comprising a state dictionary containing a mapping of state IDs of the state objects to the addresses of the state objects.

18. A generic software state machine for implementing a software application in an object oriented environment, comprising:

a set of entity objects defined for software elements of the software application;

a set of state objects defined for each entity object representative of states that the software element may enter, the set of state objects representing a number of behavior states that a particular one of the software elements may express, the particular one of the software elements being associated with a particular one of the state objects; and a set of event objects defined for each state object representative of inputs that the software element may receive or actions the software element may encounter while being associated with the particular one of the state objects, the software element operable to change its association to another one of the state objects in response to the inputs received or actions encountered.

19. The generic software state machine, as set forth in claim 18, wherein each entity object, state object, and event object includes an object ID attribute.

20. The generic software state machine, as set forth in claim 18, wherein each state object includes a state ID attribute.

21. The generic software state machine, as set forth in claim 18, further comprising an event dictionary containing a mapping of message IDs to the addresses of the event objects.

22. The generic software state machine, as set forth in claim 18, wherein the set of entity objects are grouped into a collection.

23. The generic software state machine, as set forth in claim 18, wherein the set of entity objects are grouped into an array.

24. The generic software state machine, as set forth in claim 18, further comprising a thread object adapted for receiving an input and creating a message object encapsulating the input, the message object having a message ID.

25. The generic software state machine, as set forth in claim 18, further comprising a timer class adapted to provide a set of timers, the timer class including:

an init member function adapted to create an array of timer queue head objects linked in a circular list, the timer queue head objects each begin a queue of timer entry objects;

an add timer member function adapted to add a timer entry object to a queue;

a remove timer member function adapted to delete a timer entry object from a queue; and a tick member function adapted to advance the state of timer entry objects in one queue one clock tick.

26. The generic software state machine, as set forth in claim 18, further comprising a queue entry class adapted to provide and maintain a queue of objects, the queue entry class including:

a get next member function adapted to return contents of an object after a current object in the queue;

a get previous member function adapted to return contents of an object before a current object in the queue;

a set next member function adapted to update contents of an object after a current object in the queue with a passed value;

a set previous member function adapted to update contents of an object before a current object in the queue with a passed value; and a remove entry member function adapted to remove an object in the queue.

27. The generic software state machine, as set forth in claim 19, further comprising an object dictionary containing a mapping of object IDs to the entity objects, state objects, and event objects.

28. The generic software state machine, as set forth in claim 20, further comprising a state dictionary containing a mapping of state IDs of the state objects to the addresses of the state objects.

29. The generic software state machine, as set forth in claim 18, wherein each state object comprises:

an entry member function for the state object for performing functions associated with the entry of the state represented by the state object by the entity object; and an exit member function for the state object for preforming functions associated with the exit of the state represented by the state object by the entity object.

30. The generic software state machine, as set forth in claim 24, further comprising a FSM map object adapted for receiving the message object from the thread object, and translating the message ID into an address of an entity object assigned for processing the message object.

31. The generic software state machine, as set forth in claim 24, wherein the entity object includes a process event member function adapted for processing the message.

32. The generic software state machine, as set forth in claim 25, wherein the timer entry object includes a process time out pure virtual member function adapted to perform actions when timer entry count expires.

33. The generic software state machine, as set forth in claim 30, wherein the entity object assigned for processing the message object is one of a collection of entity objects, the entity object being identifiable by an FSM instance ID contained in the message object.

* * * * *